(12) United States Patent
Challa et al.

(10) Patent No.: US 7,967,211 B2
(45) Date of Patent: *Jun. 28, 2011

(54) METHOD AND APPARATUS FOR COMMUNICATING INFORMATION FROM A MOBILE DIGITAL DEVICE TO A BAR CODE SCANNER

(75) Inventors: Nagesh Challa, Saratoga, CA (US); Venkata T. Gobburu, San Jose, CA (US)

(73) Assignee: MoBeam Inc., Cupertino, CA (US)

( * ) Notice: Subject to any disclaimer, the term of this patent is extended or adjusted under 35 U.S.C. 154(b) by 981 days.

This patent is subject to a terminal disclaimer.

(21) Appl. No.: 11/891,950

(22) Filed: Aug. 14, 2007

(65) Prior Publication Data

US 2008/0035734 A1 Feb. 14, 2008

Related U.S. Application Data

(63) Continuation-in-part of application No. 11/369,190, filed on Mar. 6, 2006, now Pat. No. 7,395,961, which is a continuation of application No. 10/770,343, filed on Feb. 2, 2004, now Pat. No. 7,028,906, which is a continuation of application No. 09/963,218, filed on Sep. 25, 2001, now Pat. No. 6,685,093.

(60) Provisional application No. 60/837,477, filed on Aug. 14, 2006.

(51) Int. Cl.
*G06K 7/10* (2006.01)

(52) U.S. Cl. .......... 235/462.46; 235/462.01; 235/462.13

(58) Field of Classification Search ............. 235/462.46, 235/462.13, 472.01, 454
See application file for complete search history.

(56) References Cited

U.S. PATENT DOCUMENTS

| | | |
|---|---|---|
| 3,993,861 A | 11/1976 | Baer |
| 4,329,684 A | 5/1982 | Monteath et al. |
| 4,403,869 A | 9/1983 | Crutcher |
| 4,613,904 A | 9/1986 | Lurie |
| 4,736,096 A | 4/1988 | Ushikubo |
| 4,879,540 A | 11/1989 | Ushikubo |
| 4,990,756 A | 2/1991 | Hoemann |

(Continued)

FOREIGN PATENT DOCUMENTS

DE 100 05 486 A1 8/2001

(Continued)

OTHER PUBLICATIONS

U.S. Appl. No. 60/837,477, Challa, et al.

(Continued)

*Primary Examiner* — Ahshik Kim
(74) *Attorney, Agent, or Firm* — David H. Carroll

(57) ABSTRACT

Techniques are described for facilitating the reliable communication of information to bar code scanners from mobile digital devices, thereby enabling mobile digital devices to easily access the current commercial infrastructure. These techniques may be used to access many other goods and services in addition to conventional commercial services. The core enabling technology is the use of various elements commonly found on mobile digital devices to provide light that simulate a reflection of a scanning beam being moved across a static bar code image, and to confirm completion of the scan. The control system may interpret the light provided by the mobile digital device as merely a conventional identification type bar code, although the control system may be enhanced to identify and receive other types of information, including identity and credit information.

60 Claims, 12 Drawing Sheets

U.S. PATENT DOCUMENTS

| | | | |
|---|---|---|---|
| 4,999,617 | A | 3/1991 | Uemura et al. |
| 5,059,778 | A | 10/1991 | Zouzoulas et al. |
| 5,468,946 | A | 11/1995 | Oliver |
| 5,488,571 | A | 1/1996 | Jacobs et al. |
| 5,523,794 | A | 6/1996 | Mankovitz et al. |
| 5,570,297 | A | 10/1996 | Brzezinski et al. |
| 5,640,002 | A | 6/1997 | Ruppert et al. |
| 5,682,030 | A | 10/1997 | Kubon |
| 5,760,383 | A | 6/1998 | Heske, III |
| 5,850,304 | A | 12/1998 | Elmers et al. |
| 5,880,769 | A | 3/1999 | Nemirofsky et al. |
| 5,953,047 | A | 9/1999 | Nemirofsky |
| 6,036,086 | A | 3/2000 | Sizer, II et al. |
| 6,041,374 | A | 3/2000 | Postman et al. |
| 6,082,620 | A | 7/2000 | Bone, Jr. |
| 6,119,943 | A | 9/2000 | Christy |
| 6,281,820 | B1 | 8/2001 | Fields |
| 6,318,631 | B1 | 11/2001 | Halperin |
| 6,679,421 | B2 | 1/2004 | Shin et al. |
| 6,685,093 | B2 * | 2/2004 | Challa et al. ............ 235/462.46 |
| 6,736,322 | B2 * | 5/2004 | Gobburu et al. ......... 235/462.46 |
| 6,854,652 | B2 | 2/2005 | Omori |
| 6,877,665 | B2 | 4/2005 | Challa et al. |
| 6,942,151 | B2 | 9/2005 | Ehrhart |
| 7,028,906 | B2 | 4/2006 | Challa et al. |
| 7,395,961 | B2 * | 7/2008 | Challa et al. .................. 235/383 |
| 2004/0019792 | A1 | 1/2004 | Funamoto et al. |
| 2005/0082370 | A1 | 4/2005 | Frantz et al. |

FOREIGN PATENT DOCUMENTS

| | | |
|---|---|---|
| EP | 1 355 258 A2 | 10/2003 |
| GB | 2 183 116 A | 5/1987 |
| GB | 2 228 641 A | 8/1990 |
| JP | 02280287 | 11/1990 |
| JP | 05250010 | 9/1993 |
| WO | WO 00/03328 | 1/2000 |
| WO | 0159688 A1 | 8/2001 |
| WO | 03028273 A2 | 4/2003 |
| WO | 2008021301 A2 | 2/2008 |

OTHER PUBLICATIONS

Aeritas Inc., Aeritas Custom Solutions—Incorporate Aeritas FreedomPass™ Line-Busting Technology for Your Customers Today![on-line], [retrieved on Feb. 5, 2002]. Retrieved from the Internet <URL: http//www.aeritas.com/aeritas.jsp?function=solutions&sub=custom>.

Aeritas Inc., Aeritas Solutions—AeritasAer Wallet [on-line], [retrieved on Feb. 5, 2002]. Retrieved from the Internet <URL: http//www.aeritas.com/aeritas.jsp?function=solutions&sub=voice>.

Aeritas Inc., Aeritas Solutions—Overview [on-line], [retrieved on Feb. 5, 2002]. Retrieved from the Internet <URL: http//www.aeritas.com/aeritas.jsp?function=solutions&sub=overview>.

Aeritas Inc., Aeritas Solutions—Platform [on-line], [retrieved on Feb. 5, 2002]. Retrieved from the Internet <URL: http//www.aeritas.com/aeritas.jsp?function=solutions&sub=platform>.

Aeritas Inc., Company—Aeritas, Inc. [on-line], [retrieved on Feb. 5, 2002]. Retrieved from the Internet <URL: http//www.aeritas.com/aeritas.jsp?function=company&sub=aeritasinc>.

Aeritas Inc., Company—Contact Us[on-line], [retrieved on Feb. 5, 2002]. Retrieved from the Internet <URL: http//www.aeritas.com/aeritas.jsp?function=company&sub=contact>.

Aeritas Inc., Electronic Barcode Solution Works with Various Wireless Devices [on-line], [retrieved on Feb. 5, 2002]. Retrieved from the Internet <URL: http//www.aeritas.com/aeritas.jsp?function=solutions&sub=barcode>.

Aeritas Inc., New Fast-Track Wireless Check-In and Security Solution [on-line], [retrieved on Feb. 5, 2002]. Retrieved from the Internet <URL: http//www.aeritas.com/aeritas.jsp?function=solutions&sub=travel>.

Aeritas Inc., New Fast-Track Wireless Check-In and Security Solution [on-line], [retrieved on Feb. 5, 2002]. Retrieved from the Internet <URL: http//www.aeritas.com/aeritas.jsp?function=solutions&sub=travel&p=2>.

Aeritas Inc., New Wireless Check-In and Security Solution for Travel—Aeritas Freedom Pass™ [online], [retrieved on Feb. 5, 2002]. Retrieved from the Internet <URL: http://www.aeritas.com/>.

Aeritas Inc., Press—Aeritas-Related Press Articles [on-line], [retrieved on Feb. 5, 2002]. Retrieved from the Internet <URL: http//www.aeritas.com/aeritas.jsp?function=press&sub=articles>.

Aeritas Inc. Press—What's the Buzz? [on-line], [retrieved on Feb. 5, 2002]. Retrieved from the Internet <URL:http//www.aeritas.com/Aeritas.jsp?function=press&sub=buzz>.

Aeritas Inc., Press Releases—Welcome to the Aeritas Media Room [online], [retrieved on Feb. 5, 2002]. Retrieved from the Internet <URL:http//www.aeritas.com/aeritas.jsp?function=press&sub=news>. et. seq.

Aeritas Inc., Sitemap [on-line], [retrieved on Feb. 5, 2002]. Retrieved from the Internet <URL:http//www.aeritas.com/aeritas.jsp?function=sitemap>.

Aviation Daily. Lufthansa Inks Check-In Deal, May 24, 2001 [online], [retrieved on Feb. 5, 2002]. Retrieved from the Internet <URL:http//www.aeritas.com/includes/press/aviation_files/channel_ebiz.html>.

Bounds, Jeff. Dallas Business Journal, Region Travels to Front in Reservations, Jun. 1, 2001 [online], [retrieved on Feb. 5, 2002]. Retrieved from the Internet <URL:http//www.aeritas.com/includes/press/dallas_business.htm>.

Boyter, Scott. Dallas-Fort Worth TechBiz, Aeritas signs deal with Siemens for European travel application, Mar. 2, 2001 [on-line], [retrieved on Feb. 5, 2002]. Retrieved from the Internet <URL: http//www.aeritas.com/includes/press/DFWTB-3-2.01.htm>.

Boyter, Scott. Dallas-Fort Worth TechBiz, Aeritas tries to fill void until 3G wireless is ready; Mobile boarding pass is just on application being tested, Feb. 19, 2001 [on-line], [retrieved on Feb. 5, 2002]. Retrieved from the Internet <URL: http//www.aeritas.com/includes/press/DFWTechBiz.htm>.

Bray, Roger. Financial Times FT.com. Inside Track: Lufthansa Plans Check-In by Wap Travel Update, May 29, 2001 [online], [retrieved on Feb. 5, 2002]. Retrieved from the Internet <URL:http//www.aeritas.com/includes/press/financial_times.htm>.

Carter, Wayne. Dallas Localbusiness.com, Aeritas wants to bring mobile commerce customers on board, Mar. 15, 2001 [on-line], [retrieved on Feb. 5, 2002]. Retrieved from the Internet <URL:http//www.aeritas.com/includes/press/localbusiness.htm>.

Closser, Stacey. Dallas-Fort Worth TechBiz. Airport Security Reinforces Need for Company's Wireless Check-In App, Oct. 22, 2001 [online], [retrieved on Feb. 5, 2002]. Retrieved from the Internet <URL:http//www.aeritas.com/includes/press/dfwtb10101.htm>.

Closser, Stacey. Dallas-Fort Worth TechBiz, Airline Boarding Passes Made Wireless, May 22, 2001 [on-line], [retrieved on Feb. 5, 2002]. Retrieved from the Internet <URL: http//www.aeritas.com/includes/press/dfw_techbiz_052201.htm>.

Conlon, Michael. Reuters.com Away on Business: Electronic Security, Nov. 22, 2001 [on-line], [retrieved on Feb. 5, 2002]. Retrieved from the Internet <URL:http//www.aeritas.com/includes/press/reuters-11-22-01.htm>.

Conlon, Michael. Reuters Technology, Away on Business: With the Wave of a Phone, Feb. 24, 2001 [on-line], [retrieved on Feb. 5, 2002]. Retrieved from the Internet <URL:http//www.aeritas.com/includes/press/SVNews2-24-2001.htm>.

Elachi, Joanna. CommWeb.com. Lufthansa Debuts Barcode Check-In and Boarding, May 25, 2001 [online], [retrieved on Feb. 5, 2002]. Retrieved from the Internet <URL:http//www.aeritas.com/includes/press/lufthansa.htm>.

Europe News. FreedomPass™ Provides Increased Security and Reduces Airport Congestion, Nov. 8, 2001 [online], [retrieved on Feb. 5, 2002]. Retrieved from the Internet <URL:http//www.aeritas.com/includes/press/euronews 1108.htm>.

Eye For Travel.com, Lufthansa m-Barqs on Wireless Check-In Project, May 23, 2001 [on-line], [retrieved on Feb. 5, 2002]. Retrieved from the Internet <URL: http//www.aeritas.com/includes/press/eye travel.htm>.

Gawlicki, Scott M. Telecom Click. Wireless Apps Get Real, Jun. 1, 2001 [online], [retrieved on Feb. 5, 2002]. Retrieved from the Internet <URL: http//www.aeritas.com/includes/press/telecomclick.htm>.

Global Wireless, Siemens Teams up for m-commerce travel service, Mar. 2, 2001 [on-line], [retrieved on Feb. 5, 2002]. Retrieved from the Internet <URL:http//www.aeritas.com/includes/press/global_news.htm>.

Goldstein, A. & Bajaj, V. The Dallas Morning News, DallasNews.com, Rush toward Wireless devices collides with reality of what they deliver, Nov. 30, 2000 [online], [retrieved on Feb. 5, 2002], Retrieved from the Internet <URL: http//www.aeritas.com/includes/press/DallasMorningNews.htm>.

Goldstein, Alan. DallasNews.com, The Dallas Morning News, Impulsity a new voice in mobile commerce; Dec. 27, 2000, [on-line], [retrieved on Feb. 5, 2002]. Retrieved from the Internet <URL:http//www.aeritas.com/includes/press/DMN-Ag.htm>.

Goldstein, Alan. The Dallas Morning News. Stalled at the Gate, Firm Checks in New Plan, Nov. 14, 2001 [online], [retrieved on Feb. 5, 2002]. Retrieved from the Internet <URL: http//www.aeritas.com/includes/press/dmn1114.htm>.

Hastings, Nick. Dow Jones Newswires. From the Floor: An Italian Job, May 30, 2001 [online], [retrieved on Feb. 5, 2002]. Retrieved from the Internet <URL:http//www.aeritas.com/includes/press/Dow%20Jones%20Interactive_files/DJInteractive.htm>.

Hobica, G. & Liang, K. Mobile Computing & Communications. Now Boarding: All Phones, [online], [retrieved on Feb. 5, 2002]. Retrieved from the Internet <URL:http//www.aeritas.com/includes/press/mobilecomputing.html>.

Houck, J. B. Wireless Newfactor, Have PDA? Will Travel, Mar. 16, 2001 [on-line], [retrieved on Feb. 5, 2002]. Retrieved from the Internet <URL:http//www.aeritas.com/includes/press/wireless_news.htm>.

Johnston, David C., The New York Times. Travel Advisory—New Cell Phone Trick: It's a Boarding Pass, Jul. 22, 2001 [online], [retrieved on Feb. 5, 2002]. Retrieved from the Internet <URL:http//www.aeritas.com/includes/press/nytimes.htm>.

Klitsgaard, Niels. Global Bluetooth Tracking, Newsletter, Mar. 14, 2001 [on-line], [retrieved on Feb. 5, 2002]. Retrieved from the Internet <URL:http//www.aeritas.com/includes/press/bluetags_files/Newsletterl.asp>.

M Business Daily. Aeritas Launches Wireless Check-In and Security Service, Nov. 8, 2001 [online], [retrieved on Feb. 5, 2002]. Retrieved from the Internet <URL:http//www.aeritas.com/includes/press/mbd1108.htm>.

m-Travel.com. Aeritas Launches Secure Wireless Check-In With Barcode, Nov. 9, 2001 [online], [retrieved on Feb. 5, 2002]. Retrieved from the Internet <URL: http//www.aeritas.com/includes/press/mtravel1109.htm>.

McDonough, Brian. Wireless Newsfactor. Wireless Connections Let Lufthansa Customers Board on the Fly, May 24, 2001 [online], [retrieved on Feb. 5, 2002]. Retrieved from the Internet <URL: http//www.aeritas.com/includes/press/wireless_news2.htm>.

Meehan, Michael. Computerworld, Sabre Rolling out wireless check-in system for air travelers, Oct. 20, 2000 [on-line], [retrieved on Feb. 5, 2002]. Retrieved from the Internet <URL: http//www.aeritas.com/includes/press/Computerworld.htm>.

Mobileinfo.com, Lufthansa Uses Mobile Devices As Digital Boarding Pass, May 22, 2001 [on-line], [retrieved on Feb. 5, 2002]. Retrieved from the Internet <URL: http//www.aeritas.com/includes/press/mobile info.htm>.

Muraskin, Ellen. Communications Convergence.com. Speaking Tour: ASR and TTS Follow the Money—Planes, Trains, Bar Codes, and Voice Verification, Jun. 5, 2001 [online], [retrieved on Feb. 5, 2002]. Retrieved from the Internet <URL: http//www.aeritas.com/includes/press/convergence.htm>.

Petersen, A. & Harris, N. The Wall Street Journal, WSJ.com, Wireless Web's Vast Promises Have So Far Been Unkept in U.S., Dec. 1, 2000 [online], [retrieved on Feb. 5, 2002]. Retrieved from the Internet <URL:http//www.aeritas.com/includes/press/wsj.htm>.

Piller, Dan. Star-Telegram.com, Wireless airport check-in to use cell phones, hand-held computers, Oct. 18, 2000 [on- line], [retrieved on Feb. 5, 2002]. Retrieved from the Internet <URL:http//www.aeritas.com/includes/press/StarTelegram.htm>.

Smith, Brad. Wireless Week.com. Resuming Mobility—Airlines Cautiously Reinstate Wireless Check-In, Oct. 29, 2001 [online], [retrieved on Feb. 5, 2002]. Retrieved from the Internet <URL:http//www.aeritas.com/includes/press/wwc1029.htm>.

Speech Technology Magazine. News & Views—Siemens Business Services, Aeritas Announce Partnership, May/Jun. 2001[online], [retrieved on Feb. 5, 2002]. Retrieved from the Internet <URL:http//www.aeritas.com/includes/press/speech.htm>.

Turek, Norbert. Informationweek.com News, WAP Apps Make Their Way To Biz-Critical Services, Mar. 19, 2001 [on-line], [retrieved on Feb. 5, 2002]. Retrieved from the Internet <URL:http//www.aeritas.com/includes/press/information.htm>.

Wireless Developer Network News. Two Entrepreneurs Flying High on Sep. 11!, Nov. 14, 2001 [online], [retrieved on Feb. 5, 2002]. Retrieved from the Internet <URL:http//www.aeritas.com/includes/press/devnet1114htm>.

Wireless Today, Wireless Could be Cure for Travelers' Airport Woes [on-line], [retrieved on Feb. 5, 2002]. Retrieved from the Internet <URL: http//www.aeritas.com/includes/pressWirelessToday 10-19.htm>.

WirelessWeek.com. Site of the Week—Aeritas, Inc., Jul. 23, 2001 [online], [retrieved on Feb. 5, 2002]. Retrieved from the Internet <URL:http//www.aeritas.com/includes/press/WirelessWeek_com.htm>.

Worldroom Travel Digest. Lufthansa Launches Mobile Check-In, May 25, 2001 [online], [retrieved on Feb. 5, 2002]. Retrieved from the Internet <URL:http//www.aeritas.com/includes/press/worldroom.htm>.

Challa et al., Reply to Office Action, U.S. Appl. No. 09/963,218, Jan. 13, 2003, 10 pages.

Challa et al., Request for Continued Examination, U.S. Appl. No. 09/963,218, May 2, 2003, 28 pages.

Challa et al., Reply to Office Action, U.S. Appl. No. 10/770,343, Sep. 13, 2005, 20 pages.

Challa et al., Reply to Office Action, U.S. Appl. No. 11/369,190, Jun. 11, 2007, 10 pages.

Challa et al., Reply to Office Action, U.S. Appl. No. 11/369,190, Nov. 7, 2007, 10 pages.

Ecrio, Inc., Reply to Office Action, European Patent Application No. 02773580.2, Jul. 18, 2007, 32 pages.

Ecrio, Inc., Reply to Office Action, European Patent Application No. 02773580.2, Oct. 15, 2008, 52 pages.

Ecrio, Inc., Reply to Office Action, European Patent Application No. 02773580.2, Feb. 18, 2010, 4 pages.

Ecrio, Inc., Reply to Office Action, European Patent Application No. 02773580.2, Jul. 2, 2010, 7 pages.

European Patent Office, Office Action, European Patent Application No. 02773580.2, Mar. 14, 2007, 4 pages.

European Patent Office, Office Action, European Patent Application No. 02773580.2, Apr. 15, 2008, 5 pages.

European Patent Office, Office Action, European Patent Application No. 02773580.2, Oct. 20, 2009, 5 pages.

European Patent Office, Office Action, European Patent Application No. 02773580.2, Mar. 2, 2010, 4 pages.

European Patent Office, Supplementary European Search Report, European Patent Application No. 02773580.2, Dec. 27, 2006, 4 pages.

International Searching Authority/US, International Search Report, International Patent Application No. PCT/US02/30453, Mar. 11, 2003, 4 pages.

International Searching Authority/US, International Search Report, International Patent Application No. PCT/US07/17884, Aug. 8, 2008, 2 pages.

International Searching Authority/US, Written Opinion of the International Searching Authority, International Patent Application No. PCT/US07/17884, Aug. 8, 2008, 5 pages.

United States Patent and Trademark Office, Notice of Allowance and Fee(s) Due, U.S. Appl. No. 09/963,218, Aug. 12, 2003, 12 pages.

United States Patent and Trademark Office, Notice of Allowance and Fee(s) Due, U.S. Appl. No. 10/770,343, Nov. 22, 2005, 13 pages.

United States Patent and Trademark Office, Notice of Allowance and Fee(s) Due, U.S. Appl. No. 11/369,190, Mar. 11, 2008, 13 pages.

United States Patent and Trademark Office, Office Action, U.S. Appl. No. 09/963,218, Nov. 18, 2002, 12 pages.

United States Patent and Trademark Office, Office Action, U.S. Appl. No. 09/963,218, Feb. 26, 2003, 10 pages.

United States Patent and Trademark Office, Office Action, U.S. Appl. No. 10/770,343, May 20, 2005, 16 pages.

United States Patent and Trademark Office, Office Action, U.S. Appl. No. 11/369,190, Jan. 10, 2007, 17 pages.

United States Patent and Trademark Office, Office Action, U.S. Appl. No. 11/369,190, Sep. 7, 2007, 49 pages.

* cited by examiner

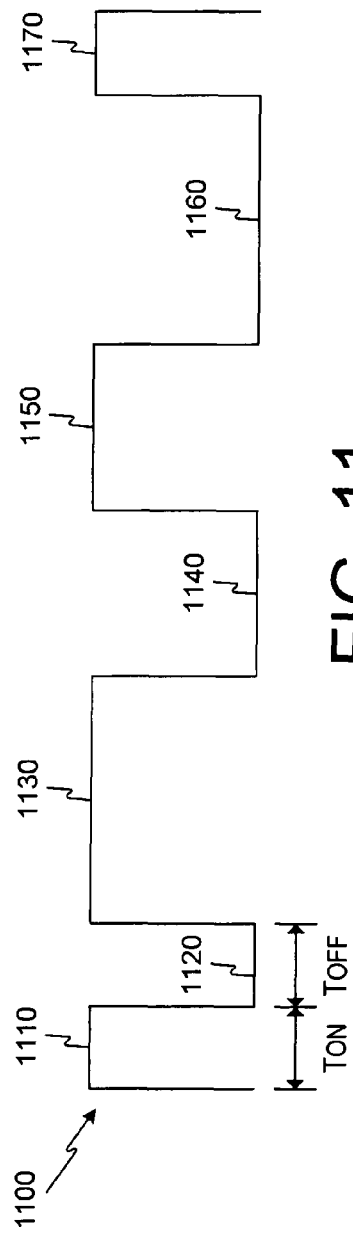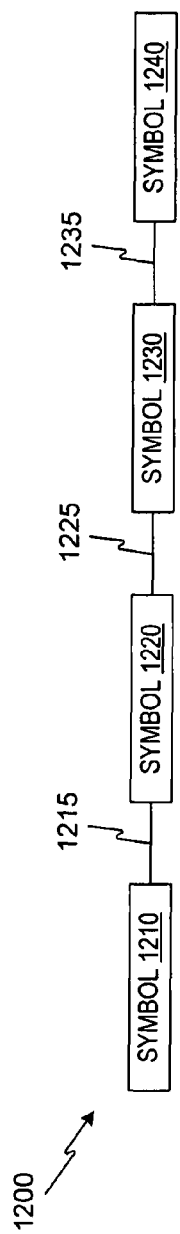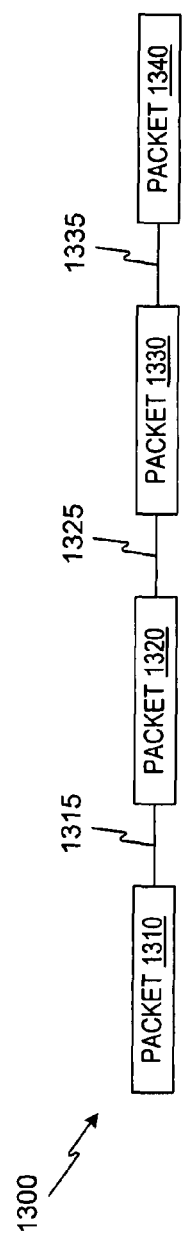

METHOD AND APPARATUS FOR COMMUNICATING INFORMATION FROM A MOBILE DIGITAL DEVICE TO A BAR CODE SCANNER

CROSS-REFERENCE TO RELATED APPLICATIONS

This application claims the benefit of U.S. Provisional Patent Application Ser. No. 60/837,477 filed Aug. 14, 2006, which is incorporated herein in its entirety by reference thereto. This application is a continuation-in-part of U.S. patent application Ser. No. 11/369,190 filed on Mar. 6, 2006, now U.S. Pat. No. 7,395,961; which is a continuation of U.S. patent application Ser. No. 10/770,343 filed on Feb. 2, 2004, now U.S. Pat. No. 7,028,906; which is a continuation of U.S. patent Ser. No. 09/963,218 filed on Sep. 25, 2001, now U.S. Pat. No. 6,685,093, all of which are hereby incorporated herein in their entirety by reference thereto.

BACKGROUND OF THE INVENTION

1. Field of the Invention

This invention relates generally to communicating information encoded in a bar code format, and more specifically to systems, methods and apparatus for communicating information encoded in a bar code format from a mobile digital device to a bar code scanner.

2. Description of the Related Art

The use of bar code scanners in a great many aspects of everyday life is commonplace. Bar code scanners are found in many different types of facilities, including supermarkets, airport security, check-in and boarding areas, stadiums, libraries, test centers, conference centers, and many other places. The use of bar code scanners has dramatically increased the speed at which many commonplace transactions can be completed.

While typically printed on paper labels and stubs, bar codes may also be shown on display screens; for example, in International Publication no. WO 00/03328 dated Jan. 20, 2000, Motorola Inc. of Schaumburg, Ill., describes the display of bar coded information on a selective call receiver ("SCR"). Demographic information concerning the user of the SCR is stored in the SCR. The demographic information is visually displayed on the SCR as a bar code such that it can be read by a bar code scanner, as in a store or at a point-of-sale. A stored coupon may also be displayed in bar code format so that it can be read and redeemed at the point-of-sale. A stored affinity card code and a unique identifier may also be displayed in bar code format so that they can be read to identify a selected affinity group and the customer at the point-of-sale. As a further example, Aeritas Inc. of Dallas, Tex., has proposed using voice recognition technology to allow a cellular telephone user to identify himself or herself while obtaining wirelessly from an airline computer an electronic bar coded boarding pass at the airport using only a cellular telephone. As proposed, the electronic boarding pass may be displayed as a bar code at the time of boarding on the screen of the cellular telephone so that the gate attendant may scan the boarding pass in a conventional manner.

While presenting information such as coupons and user affinity information in bar code form on a cell phone display can be quite useful, the technique has several disadvantages. Some bar code scanners, for example, cannot reliably read bar codes displayed on certain types of cellular phone displays because the contrast ratio between the bars and spaces shown on the screen, which typically is a liquid crystal display ("LCD"), is not sufficient. Further, the physical dimension and/or resolution of the display may also limit the size of the bar code that may be displayed at one time.

U.S. Pat. No. 6,685,093 issued Feb. 3, 2004 to Challa et al. describes a variety of techniques for communicating information between a mobile communications device and a bar code reader. U.S. Pat. No. 6,877,665 issued Apr. 12, 2005 to Challa et al. describes a variety of techniques for communicating information encoded in a light-based signal using a fob device. While the techniques described in these Challa et al. patent are extremely useful across a broad range of applications, further improvement is desired.

BRIEF SUMMARY OF THE INVENTION

One embodiment of the present invention is a method of communicating transmission information from a mobile digital device to a bar code scanner, comprising maintaining the transmission information on the mobile digital device; generating, in the mobile digital device, a signal to simulate a reflection of a bar code scanner scanning beam being moved across a static visual image of the transmission information in a bar code format; and transmitting light pulses from the mobile digital device in accordance with the signal.

Another embodiment of the present invention is a mobile digital device comprising a light source; a stored program component for maintaining the transmission information on the mobile digital device; a stored program component for generating a signal to simulate a reflection of a scanning beam of a bar code scanner being moved across a static visual image of the transmission information in a bar code format; and a stored program component for transmitting light pulses from the light source in accordance with the signal.

BRIEF DESCRIPTION OF THE SEVERAL VIEWS OF THE DRAWINGS

FIG. 11 is a waveform diagram of a symbol.

FIG. 12 is a schematic diagram of a packet.

FIG. 13 is a schematic diagram of a set.

DETAILED DESCRIPTION OF THE INVENTION, INCLUDING THE BEST MODE

The techniques described herein facilitate the reliable communication of information to bar code scanners from mobile digital devices. Mobile digital devices are electronic devices that can be easily carried on the person, and include mobile communications devices such as mobile phones and mobile browsers and communications-enabled personal digital assistants ("PDA"), mobile entertainment devices such as gaming devices and audio and video players, and other devices suitable for being carried on the person such as fobs and USB Flash drives. These devices typically have processors or microcontrollers and internal and/or removable memory, and operate in accordance with computer program components stored in the memory. Mobile digital devices are suitable for many uses, including communications, entertainment, security, commerce, guidance, data storage and transfer, and so forth, and may be dedicated to a particular use or may be suitable for a combination of uses. These techniques described herein enable the large and growing population of mobile digital devices, and in particular mobile entertainment devices and powerful convergence devices, to use well established and widely adopted bar code standards to interact with the current commercial infrastructure, which is highly dependent on bar code scanners at points of sale. The same techniques may be used to access many other goods and services in addition to conventional commercial services.

The core enabling technology is the use of various optical elements commonly found on mobile digital devices to provide light that simulate a reflection of a scanning beam being moved across a static bar code image. The light provided is interpreted by the control system of the bar code scanner as an actual scan of a bar code image, which enables the mobile digital device to appear as any physical item that might carry bar code image, including a coupon, affinity card, drivers license, security card, airline boarding pass, event ticket, and so forth. However, the interpretation by the control system is not limited to a bar code on a physical item, and may be used for any purpose that relies on communication of an identification code, and even for communication of other types of information including identity and credit information. The various optical elements useful for this purpose include screens which reflect light, and screen backlights, IR ports, lasers, LEDs, and light bulbs which generate light. Arrays of LED's such as are used to backlight screens, keypads, and thumb board keyboards are also suitable, and the LED's of the array may be simultaneously driven if desired.

Figure 1A:
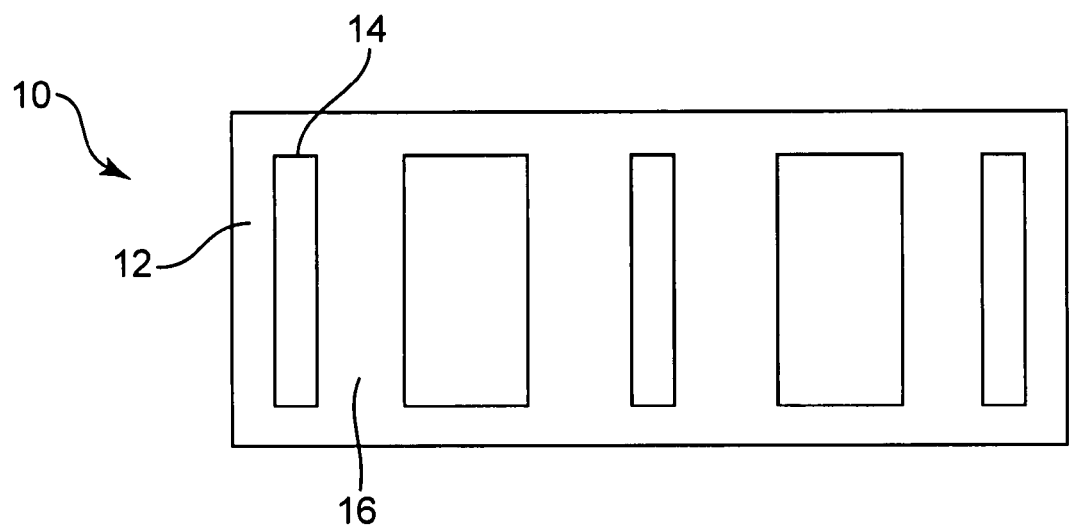
FIG. 1A is a plan view of an illustrative one-dimensional bar code.

FIG. 1A shows a bar code 10 that utilizes a series of vertical lines, i.e., bars 14, and spaces 16 to represent an identification code. Different combinations of the bars and spaces can be used to represent different characters.

Conventional bar code scanners include sequential bar code scanners and charge-coupled device ("CCD") bar code scanners. One type of sequential bar code scanner uses a scanning beam, typically narrow band light in the visible spectrum such as red laser, but potentially any bandwidth of light in the visible or infrared spectra, to pass over a sequence of bars and spaces such as bar 14 and space 16 sequentially, e.g., left to right and/or right to left. Another type of sequential scanner is a wand scanner, which is swept across the bar code by a user to create the scanning beam. As the scanning beam of light scans across the bar code 10, the beam is at least partially reflected back to the scanner by the spaces 16 and is at least partially absorbed by the dark bars 14. A receiver, such is a photocell detector, in the bar code scanner receives the reflected beam and converts the beam into an electrical signal. As the beam scans across the bar code, the scanner typically creates a low electrical signal for the spaces 16, i.e., reflected beam, and a high electrical signal for the bars 14, i.e., where the beam is absorbed. However, the scanner may create a low electrical signal for the bars 14 and a high electrical signal for the spaces 16 if desired. The width of the elements determines the duration of the electrical signal. This signal is decoded by the scanner or by an external processor into the identification code that the bar code represents.

The CCD type scanner takes a digital image of the bar code, and decodes the digital image using software that is well known in the art to convert the elements into the identification code.

While a bar code may be displayed on the screen of a mobile digital device, many of these screens are not suitable for this purpose. In the sequential-type scanners and the CCD-type scanners, the contrast between the bar and space elements is used to distinguish the elements and decode the bar code. However, the screens of many types of mobile digital devices, such as the LCD screen of a PDA or a cell phone, for example, tend to have low contrast between the gray "off" state designating a space of the bar code and the black "on" state designating a bar, relative to the contrast that is present in a bar code printed on a black-and-white label. This lower contrast between the elements of the bar code displayed on a screen can result in a lower reliability of the decoding process. Moreover, many types of mobile digital devices have extremely small screens or no screens at all.

Figure 2:
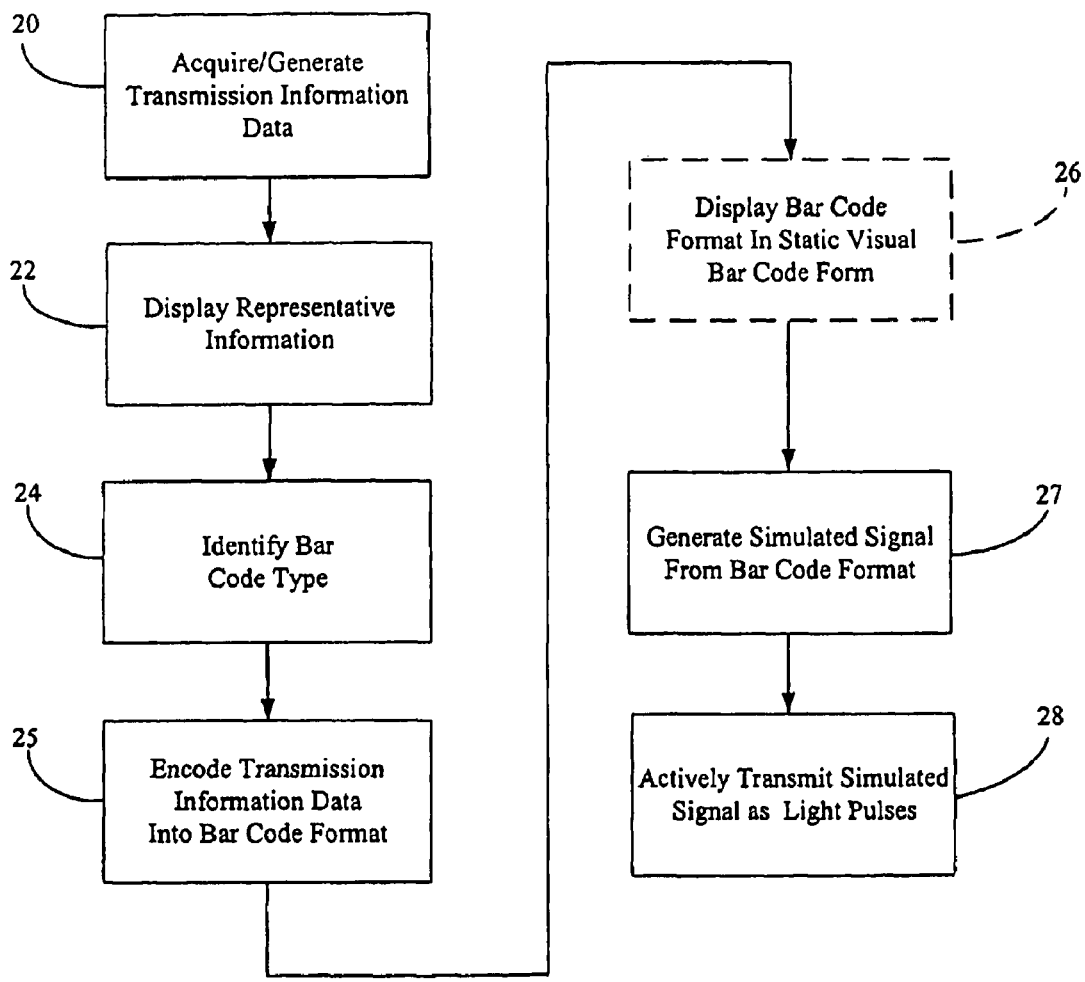
FIG. 2 is a flow chart of a method of actively providing transmission information data from a mobile digital device to a bar code scanner.

While many types of mobile digital devices either have inadequate screens (space, contrast, or both) for statically displaying bar codes or have no screens at all, mobile digital devices generally have one or more light sources or light reflectors that may be used in accordance with the techniques described herein to communicate bar code information reliably with light. FIG. 2 shows a method of generating a signal for use with a sequential bar code scanner that simulates a bar code with light pulses. The method of FIG. 2 is particularly useful for sequential bar code scanners that use the reflection of a scanning beam being moved over a bar code. In block 20, transmission information data is acquired or generated. The transmission information data may be any type of data that one may wish to communicate while at a facility equipped with a bar code scanner, including information conventionally communicated using bar codes, as well as other types of information that are not conventionally communicated using bar codes because of, for example, physical limitations imposed by the bar code format. The transmission information data, for example, may include numeric, alphabetic, or alphanumeric data, an index, or other data values. The transmission information data may represent, for example, coupons, identification codes, boarding pass information, e-ticket information, ticket information, credit card information, debit card information, automated teller machine card information, identification information, account information, electronic payment information, wire transfer information, purchase information, security information, affinity information, and so forth.

The transmission information data may be stored locally on the mobile digital device, such as in random access memory ("RAM") or read only memory ("ROM"), or acquired from a remote source. The mobile digital device may include, for example, static or dynamic RAM ("SRAM" or "DRAM," respectively) memory, FLASH memory, other types of memory known in the art, or indeed any other type of memory. The transmission information data may be programmed into the device, entered into the device by the user, or received by the device from a remote source over any known communication technology such as wireless transmission, universal serial bus ("USB") transmission, parallel transmission, and serial transmission. The remote source may be a personal computer, a wireless operator, a server networked to the wireless operator, a peer networked to the wireless operator, a wireless data port, and so forth.

Figure 4:
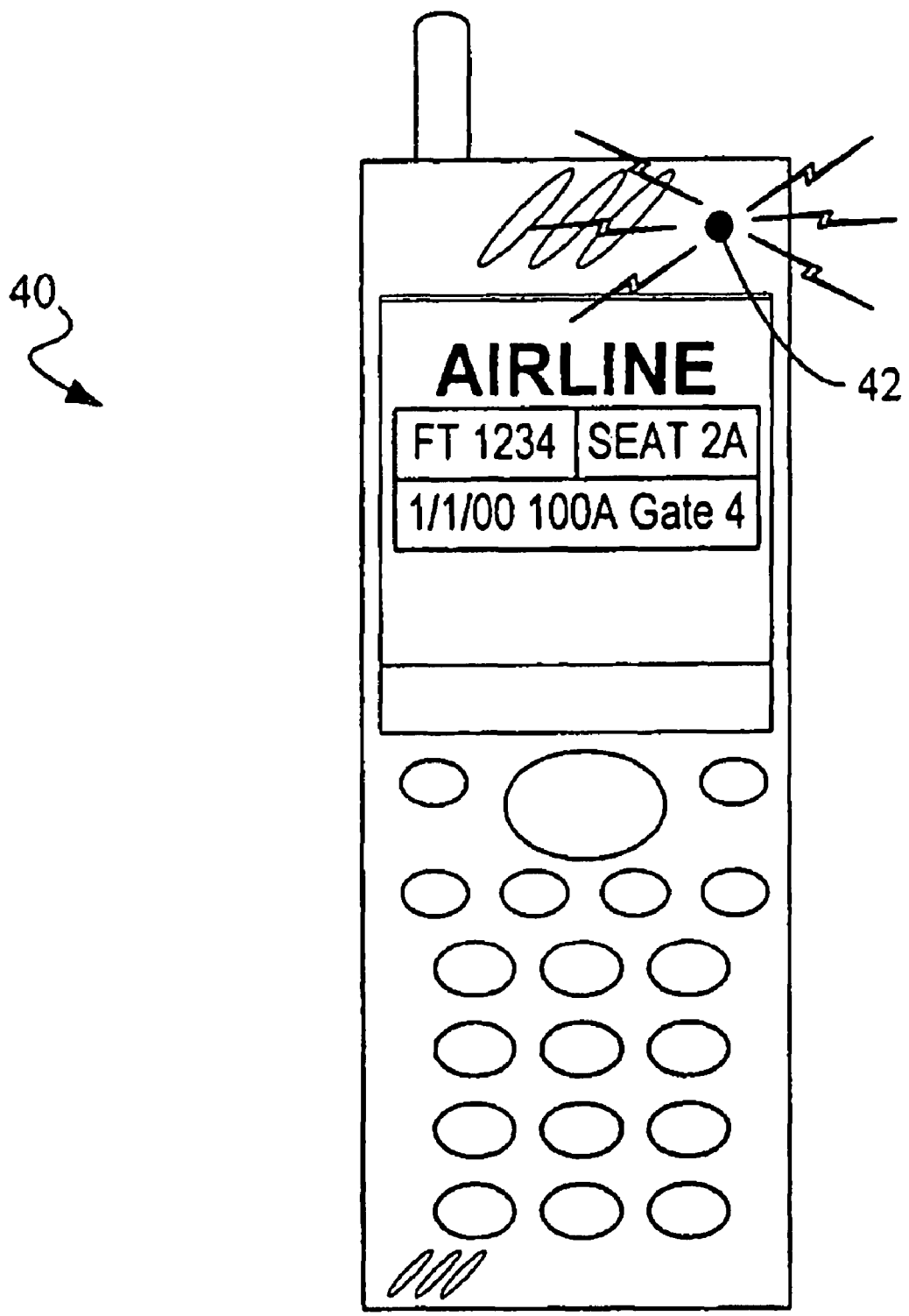
FIG. 4 is a plan view of a mobile phone in which an LED actively provides a signal representing transmission information data to a bar code scanner.
Figure 5:
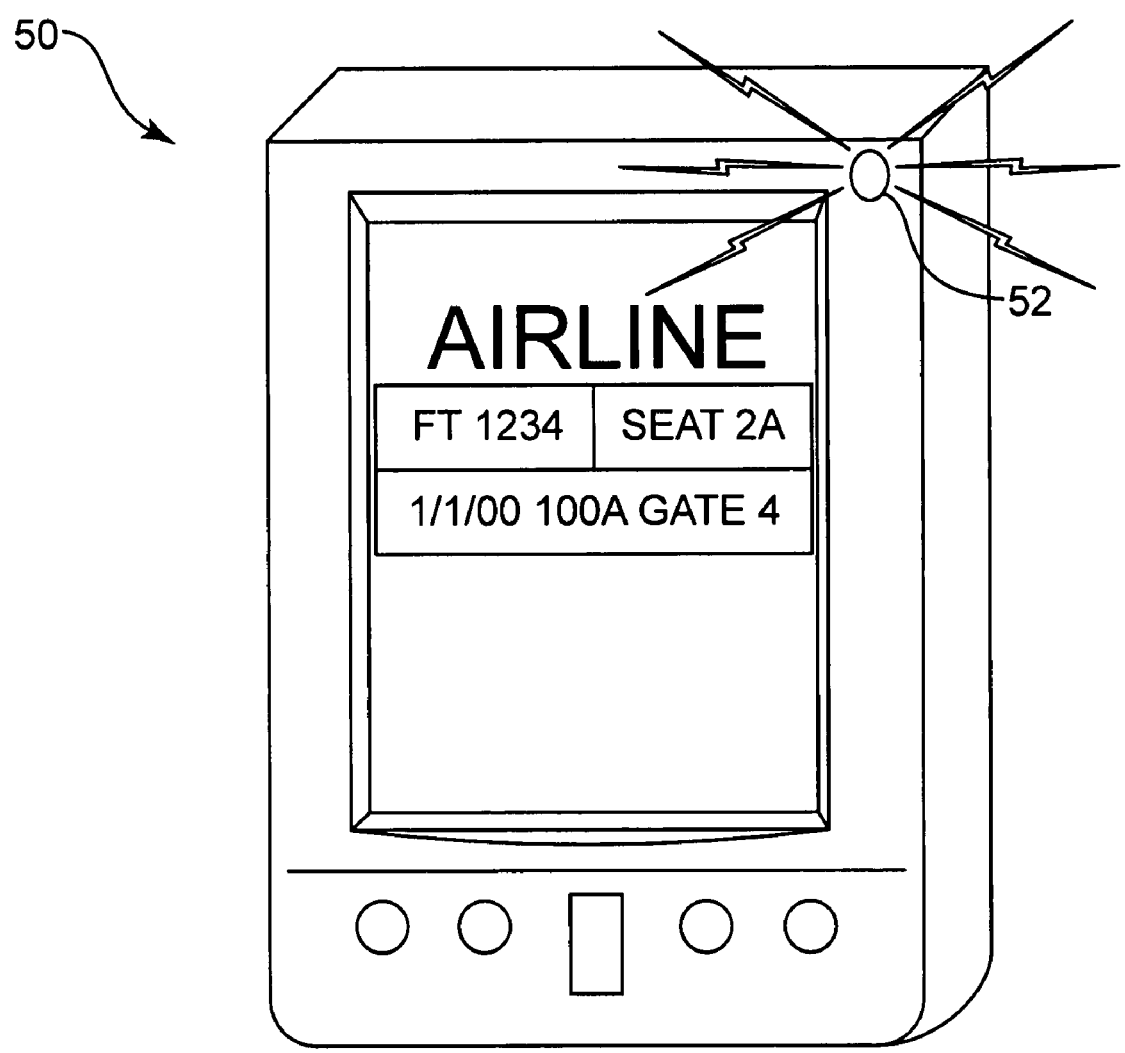
FIG. 5 is a front perspective view of a personal digital assistant in which an LED actively provides a signal representing transmission information data to a bar code scanner.
Figure 6:
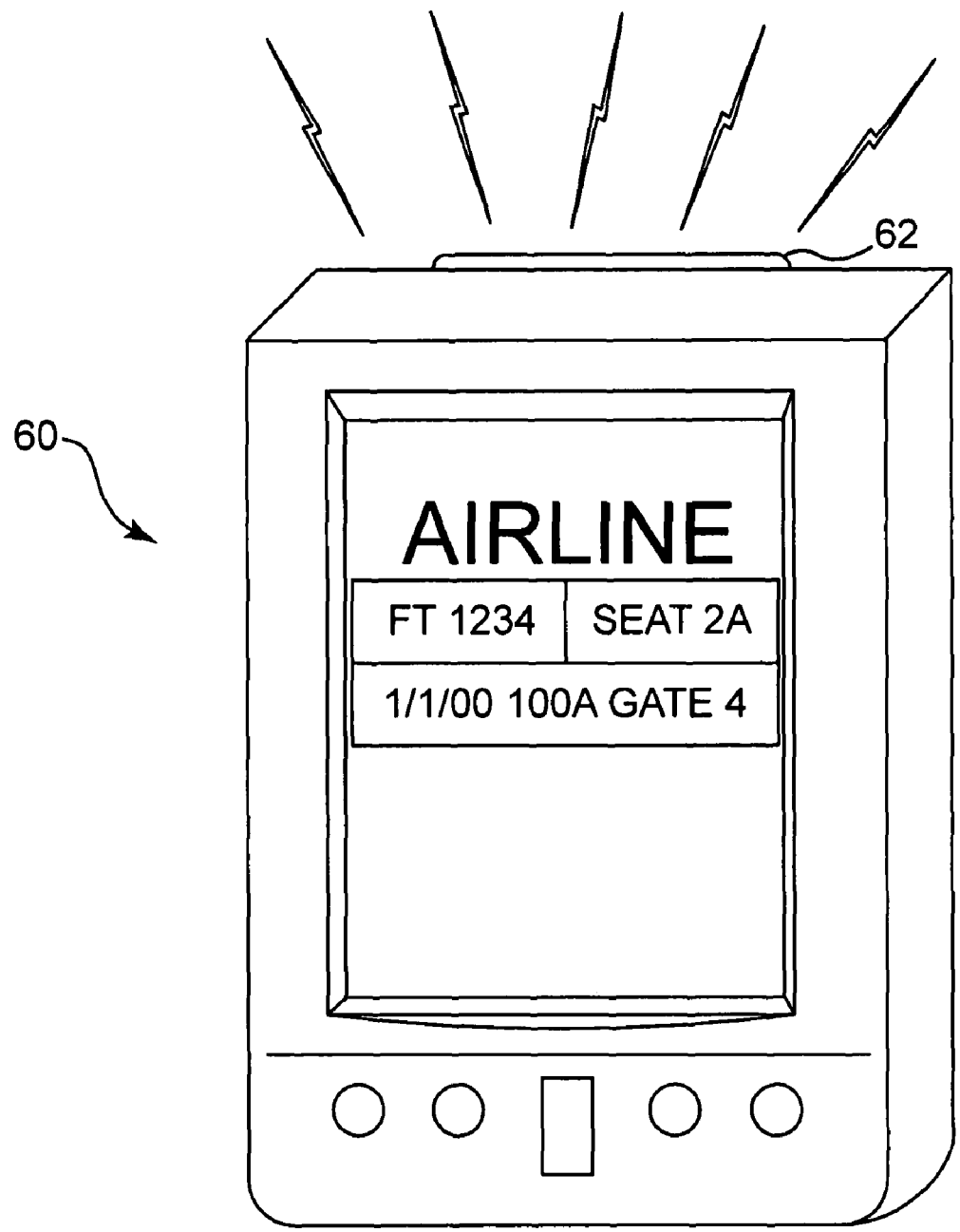
FIG. 6 is a front perspective view of a personal digital assistant in which an IR port actively provides a signal representing transmission information data to a bar code scanner.

In block 22, representative information for the transmission information data that will identify the transmission information data to a user of the mobile digital device is presented on an output facility of the device. The output facility may include, for example, a display such as an LCD screen of a PDA or wireless telephone, a speaker, or any other output device for communicating with a user. The representative information may include the transmission information data itself, or may be other information that the user will associate with the transmission information data. In order to identify the desired transmission information data item, the representative information that will identify that transmission information data item may be rendered, for example, in a textual, numerical, and/or graphical form and displayed on a screen of a suitably equipped mobile digital device, or an audio, video or multimedia message that is played by a suitably equipped mobile digital device. In FIGS. 4, 5, and 6, for example, boarding pass information is displayed on a screen of a mobile communications device identifying the airline, the flight and seat numbers, the date and departure time of the flight, and the gate number. In this manner, the user of the mobile digital device can identify the transmission information data that is to be presented, is being presented, or has been presented to the bar code scanner. If multiple transmission information data items are stored locally on the device and/or remotely retrieved, for example, the user can scan through them and select the appropriate transmission information data item to be presented to the bar code scanner.

In block 24, a bar code type is identified. The bar code type may be any type of barcode known in the art, such as, but not limited to, a UPC (including UPC A and UPC E), EAN (including EAN 13 and EAN 128), Interleaved 2 of 5, Code 93, Code 128, and Code 39, or specially designed bar code types.

In block 25, the transmission information data is encoded into a bar code format for the identified bar code type. The bar code format may be represented, for example, by a binary array. In a typical single-dimensional barcode, for example, the smallest width of a bar or space element of a bar code may be designated as a single element of an array. If the bar code has a width of 256 dots or pixels, and the smallest element of the bar code has a width of 4 dots or pixels, for example, a binary array having sixty four array elements (e.g., a1, a2, . . . , a64) may be used to represent the bar code format. Each array element is assigned a value depending on whether that portion of the bar code is part of a bar or a space. A bar, for example, may be designated as having a value equal to one (e.g., a1=1), and a space may be designated as having a value equal to zero (e.g., a32=0). The array may also alternatively be a two-dimensional array, such as a bit map, that may be easily displayed on a screen. In yet another example, the transmission information data may be encoded into a digital series corresponding to a bar code representation of the bar code type selected in block 24. Alternatively, the transmission information data may be encoded into any number of other formats that may correspond to the selected bar code type identified in block 24. The bar code format may also be compressed or encrypted, such as when the bar code format is to be transmitted from a remote source to the mobile digital device.

Optionally, the transmission information data may be displayed in static visual bar code form as shown in block 26. In this manner, a mobile digital device can provide the transmission information date as a static visual bar code, which may be readable by CCD scanners and some types of sequential bar code scanners. Other visual information may be displayed as well, such as, for example, a visual image of a product corresponding to the transmission information.

In block 27, a signal to simulate the reflection of a scanning beam being moved across a visual image of the bar code format of block 25 is generated from the bar code format. The simulated signal may be generated corresponding to an approximated or measured scanning rate. If the simulated signal is to be generated for a scanner such as a laser scanner that utilizes a scanning rate in the range of about 30 to about 60 scans per second, the simulated signal may be generated using a scan rate within that range of scan rates (e.g., about 45 scans per second). Other types of scanners such as supermarket scanners are much faster, scanning at a rate of about 3000 to about 6000 scans per second. The simulation signal should be generated using a scan rate within that range. Alternatively, the simulated signal may be generated using a variable scan rate that is swept throughout a range of scan rates. Alternatively, as described below with respect to an exemplary infrared transmitter/receiver pair, the scan rate of the scanning beam may be measured where a receiver is available to detect the scanning beam. In this case, once the scanning rate or rates are determined, the signal is generated in block 27 corresponding to this scan rate or rates.

In block 28, the simulated signal is transmitted as light pulses. For purposes of the present description, the term "light" refers to visible light and infrared light spectra. The term "pulse" refers merely to a change in light level; the characteristics of the change, i.e. the specific waveform shape, are not critical. The light pulses may be generated in any visible or infrared wavelength desired by any light source known in the art, such as an LED, a laser, an infrared transmitter, a backlight of an LCD screen, or a light bulb.

FIG. 1A shows an illustrative one-dimensional bar code 10 that may be displayed in block 26 of FIG. 2. The bar code 10 includes a quiet zone 12, bars 14, and spaces 16. While FIG. 1A shows a quiet zone 12 being lighter, the quiet zone may alternatively be darker if the scanner is adapted to recognize it. Correspondingly, the bars 14 and the spaces 16 may be inverted such that the bars 14 are lighter than the spaces 16.

Figure 1B:
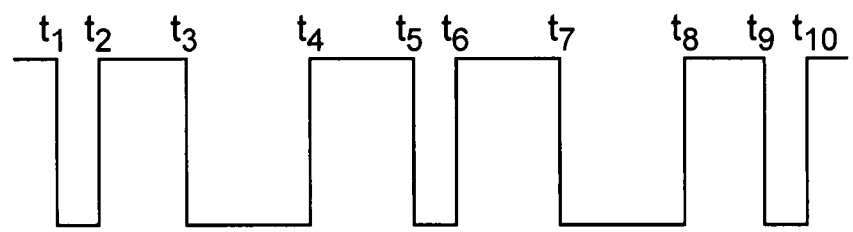
FIG. 1B is a graph of a characteristic of a signal representing the bar code of FIG. 1A against time.

FIG. 1B shows an idealized representation of a signal that may be generated in block 27 of FIG. 2 for actual transmission as light pulses in block 28, by which is created light corresponding to the reflection of a scanning beam off bar code 10 depicted in FIG. 1A. As a scanning beam scans across the quiet zone 12 and the spaces 16, the beam is reflected to the scanner. As the beam scans across the bars 14, however, the beam is absorbed (or at least the reflected beam has a lower amplitude than the beam reflected from the lighter quiet zone 12 and spaces 16). Thus, the amplitude of the beam received at the scanner decreases at times t1, t3, t5, t7, and t9, which correspond to the beam reaching a leading edge of a bar 14, and increases at time t2, t4, t6, t8, and t10, which correspond to the beam reaching the falling edge of a bar 14.

Transmission information data encoded in a bar code format may be actively provided to a sequential bar code scanner by providing a light-based representation of a signal, such as shown in FIG. 1B, to a scanner, instead of providing a potentially less reliable static bar code image to the scanner. Since many bar code scanner receivers will receive visual wavelength signals, mobile digital devices that have components that operate at these wavelengths can be used to provide an active light representation of the simulated reflected scanning beam to a sequential bar code scanner. The transmission information data may thus be actively provided to current or improved sequential bar code scanners without the requirement of altering the existing bar code scanner infrastructure.

When the bar code scanner receives the beam, the scanner decodes the on/off sequence of the beam to determine the transmission information data being provided, in a manner known in the art.

Sequentially providing such a signal to a sequential bar code scanner further allows for the transmission of bar code information without regard to the physical size and/or resolution limitations of the device display. A bar code representation that might otherwise require an unreasonably wide screen to convey all the information to the scanner, for example, may be provided directly to the scanner in one step from even the narrowest of screens.

Figure 3:
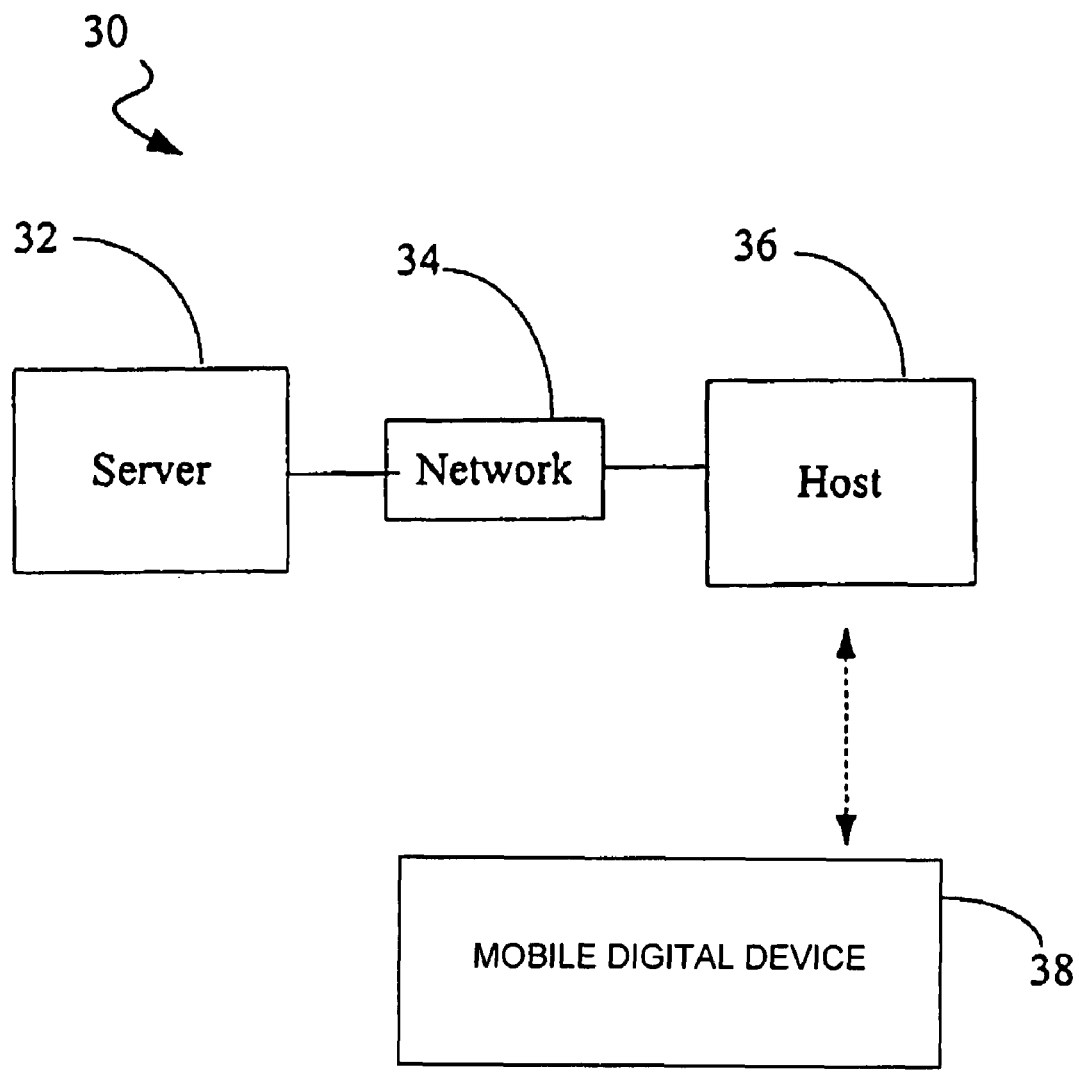
FIG. 3 is a schematic block diagram of a system for providing transmission information data to a mobile digital device, for presentation to a bar code scanner.

FIG. 3 shows a schematic representation of one implementation of a system 30 for providing transmission information data to a bar code scanner from a mobile digital device. Server 32 is connected to a host 36 via a network 34, such as a local area network ("LAN"), a wide area network ("WAN"), an intranet, an extranet, the Internet, or other known network. The host 36, in turn, is connected to the mobile digital device 38, such as through wireless technology, phone line, dedicated service line ("DSL"), cable connection, or other known remote access technology. In one approach, for example, the server 32 may maintain a database of transmission information data items that are transmitted to the mobile digital device 38 via the host 36. A user of the mobile digital device may remotely select one or more transmission information data items, or the server 32 may provide a transmission information data item that has been selected for the user of the mobile digital device 38 either by the server 32 or some other system and communicated to the server, such as via the network 34. The server 32 retrieves the one or more transmission information data items from the database and provides the transmission information data to the mobile digital device 38 via host 36. In this approach, the mobile digital device 38 receives the transmission information data in block 20 of FIG. 2, and performs the remaining operations depicted in blocks 22, 24, 25, 27, and 28.

Alternatively, some or all of the processing shown in blocks 20, 22, 24, 25, and 27 may be performed upstream of the mobile digital device 38, such as at server 32, at host 36, or at an intermediate location such as a component of network 34. For example, the server 32 may retrieve a transmission information data from a database, either on its own or in response to a request from the user of the mobile digital device 38, identify a bar code type (block 24), encode the transmission information data into a bar code format such as the array described above (block 25), and transmit the bar code format to the mobile digital device 38. If the mobile digital device 38 does not already have representative information to display on the screen of the device 38 (block 22), the server 32 may also provide this information to the mobile digital device 38. Information provided to the mobile digital device 38 may be encrypted and/or compressed as known in the art.

FIGS. 4 and 5 show a wireless phone 40 and a PDA 50 that include an alternative signal generator that may be used as described herein. The wireless phone 40 and the PDA 50 include visible light sources, such as light emitting diodes ("LEDs") 42 and 52, respectively, that may be used to present bar code information to a sequential bar code scanner. Such LEDs are commonly used for such purposes as power management, including battery management, and user notification. The LEDs 42 and 52 of the wireless phone 40 and the PDA 50, respectively, may be alternated between on and off or between relatively bright and relatively dark settings in accordance with the simulated signal to simulate the movement of the reflection of a scanning beam across a conventional bar code. Thus, the LEDs 42 and 52 may be set to their brightest setting for a duration corresponding to the time period during which the simulated scanning beam would transition from the falling edge to the leading edge of a bar, and to their darkest setting for the duration corresponding to the time period during which the simulated scanning beam would transition from the leading edge to the falling edge of a bar. If the light source is capable of emitting different colors such as red and blue, the light source may be alternated between different colors to simulate a reflection from a visual image of the bar code format.

FIG. 6 shows a personal data assistant ("PDA") 60 that may alternatively be used to actively provide transmission information data within the scope of the present invention. The PDA 60 includes an infrared ("IR") transmitter/receiver pair 62 that is typically used to exchange digital information. The PDA 60 may, for example, be operating under such operating systems as the Palm™ operating system and the Windows™ CE operating system. Alternatively, other electronic devices that include a transmitter/receiver pair, such as an IR transmitter/receiver pair, may also be used within the scope of the present invention. In one approach, the PDA 60 selects a scan rate for the scanning beam, calculates a signal that corresponds to the reflection of a simulated scanning beam moving across a bar code image at that scan rate, and transmits that signal via the transmitter of the IR transmitter/receiver pair to the scanner.

Figure 7:
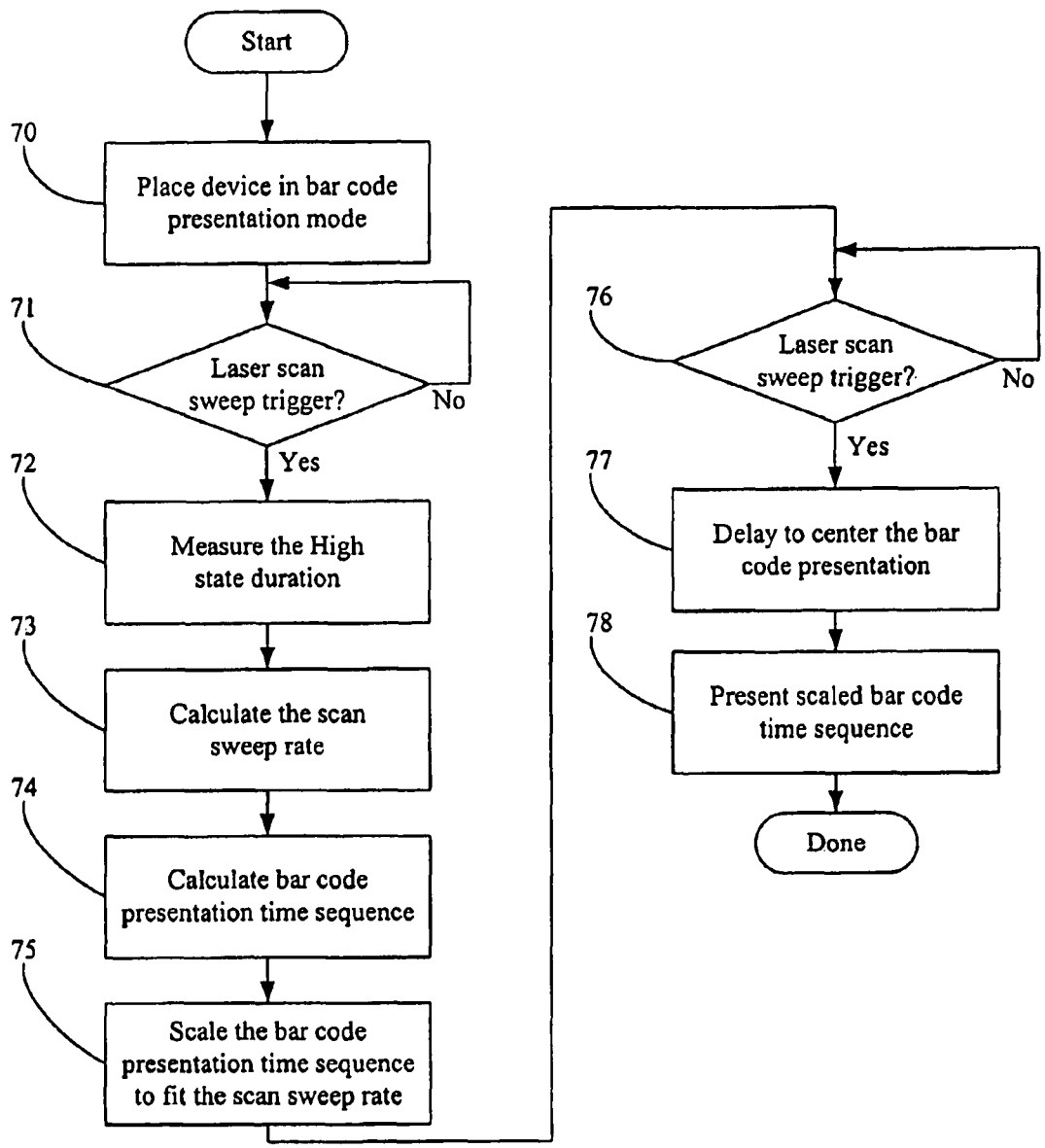
FIG. 7 is a flow chart of a method of synchronizing an active presentation of transmission information data by a mobile digital device to a scan sweep of a bar code scanner.

In an alternative approach, the receiver of the pair may be used to detect the scan rate of a sequential bar code scanner beam over one or more scan cycles. The PDA 60 may then calculate the scan rate of the beam and synchronize its transmission of a simulated reflected scanning beam to the scanner. If no beam is detected, a default scan rate may be used. As shown in the illustrative method of FIG. 7, if the IR transmitter/receiver pair 62 is not dedicated to the presentation of bar code information for the mobile digital device and the device cannot distinguish the scanning beam from other IR transmissions, the PDA 60 is placed in a bar code presentation mode in block 70. In this mode, when a scanning beam of a bar code scanner is detected in block 71 at the receiver of the IR transmitter/receiver pair 62 of the PDA 60, an interrupt trigger is generated indicating the start of the sequential scanner beam sweep. If a signal at a pin of the processor is normally low (logical state) when no signal is detected and high when a signal is detected at the receiver, the processor monitors the receiver and determines the duration that the pin stays at the high logical state in block 72. This time corresponds to one scanner sweep. The processor can determine the scan rate from the duration of one scan sweep in block 73. For example, a scan sweep of about 33 milliseconds corresponds to a scan rate of about 30 scans per second and a scan sweep of about 10 milliseconds corresponds to a scan rate of about 100 scans per second. The processor also calculates the time sequence of the scan sweep that corresponds to the leading and ending quiet zones 12, and the bar code data zone in block 74. This time sequence is scaled for presenting the simulated reflected scanning beam to the scanner in one scan sweep in block 75. When another incoming trigger is detected corresponding to the start of a new scan sweep in block 76, the processor delays the start of block 78 to center the presentation of bar code data in the scan sweep of the scanner, and the simulated reflection of the scanning beam corresponding to the bar code is transmitted via the IR transmitter of the IR transmitter/receiver pair 62 in block 78.

Figure 8:
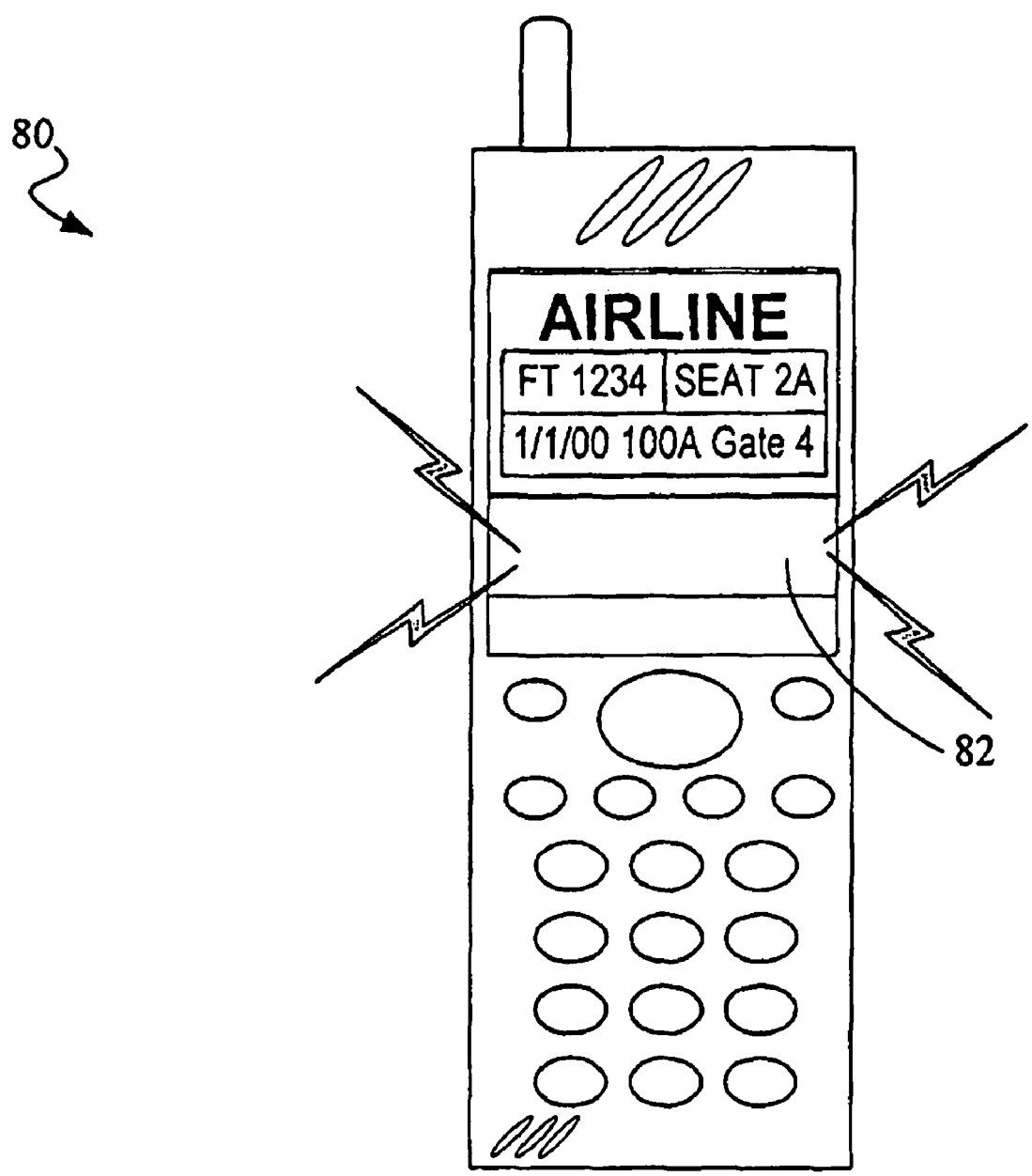
FIG. 8 is a plan view of a mobile phone in which a display screen actively provides a signal representing transmission information data to a bar code scanner.
Figure 9:
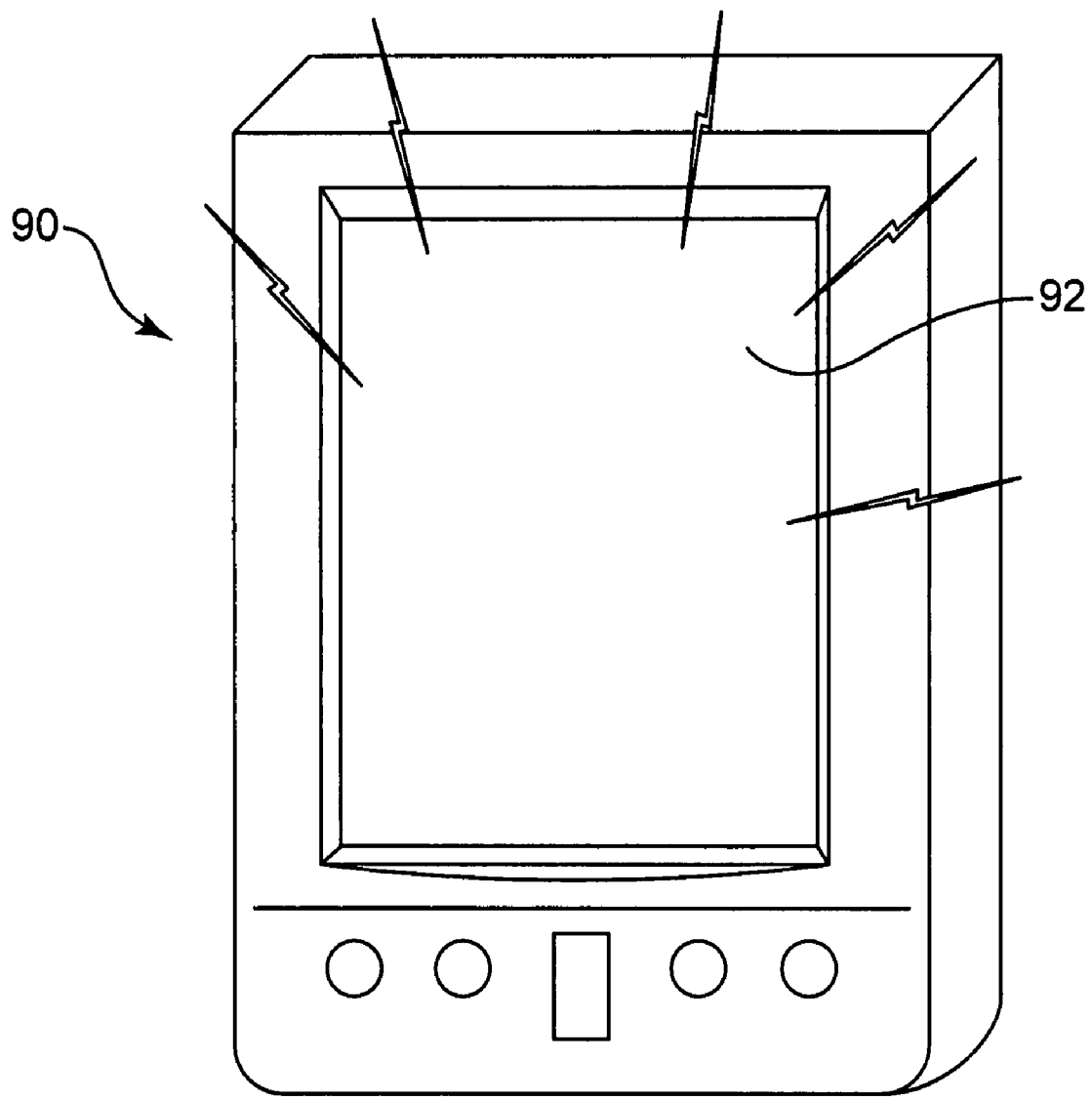
FIG. 9 is a front perspective view of a personal digital assistant in which a display screen actively provides a signal representing transmission information data to a bar code scanner.

FIGS. 8 and 9 show pictorial representations of a wireless phone 80 and a PDA 90 that include displays 82 and 92, respectively, that may be used to present transmission information data to a sequential bar code scanner in accordance with the techniques described herein. It will be appreciated that the displays 82 and 92 are illustrative, and the display may be part of any type of mobile digital device, including audio and video players, gaming devices, and the like. The displays 82 and 92 of the wireless phone 80 and the PDA 90, respectively, may be alternated between on and off, or between relatively bright and relatively dark settings, or between different colors such as red and blue, to simulate the movement of a scanning beam across a conventional bat code. Thus, the displays 82 and 92, or at least a significant part thereof, may be set to their brightest setting for a duration corresponding to the time period during which the simulated scanning beam would transition from the following edge to the leading edge of a bar, and to their darkest setting for the duration corresponding to the time period during which the simulated scanning beam would transition from the leading edge to the following edge of a bar. Alternatively, any aspect of the display that may be changed and recognized by a bar code scanner receiver may be utilized. A display backlight, for example, may be turned on and off, or brightened and dimmed, to provide the simulated scanning beam signal to the receiver. In some instances, combining the techniques may be most effective. For example, reflected light may be simulated by a white screen with a backlight on, while absorbed light may be simulated by a dark screen with a backlight off.

The displays 82 and 92 may be used to display the representative information of the transmission information data (block 22 in FIG. 2) and/or the static bar code (block 26 in FIG. 2) and to actively provide the transmission information data to a bar code scanner (block 28 in FIG. 2) in various manners. For example, the display screen may display the representative information first and, after a prescribed time period or after the user changes the state of the mobile digital device such as by pressing a button, clear the display and begin to actively provide the transmission information data to the bar code scanner. Alternatively, such as shown in FIG. 8, different portions of the display may be used for display the representative information data and to actively provide the transmission information data. The display may also be used to display the representative information and to simultaneously actively provide the transmission information data such as by flashing the back light, changing the colors, inverting the display, or other changes in the display characteristics.

Where the display is used to simultaneously display representative information to the user and to actively transmit simulated signals as light pulses, it may be desirable that the active transmission be done in such a manner as to minimize the user's perception of the active transmission. This may be done in a number of different ways, which may be used individually or in various combinations.

In one illustrative implementation, the amplitude of the driving signal is adjusted to account for variations in the ambient light. In well lit areas, the amplitude may be increased, whereas in lower ambient light conditions the amplitude may be reduced. Reducing the amplitude of the signal in low ambient light conditions has the further benefit of reducing the power consumption required of the device. The availability of an ambient light level sensor on the presentation device makes facilitates compensating for variations in the ambient light. Many devices in common use today such as mobile phones already have a built-in camera that adjusts to a variety of lighting conditions on the basis of a built in light sensor. This can be effectively used in monitoring the ambient light conditions for the barcode presentation, and adjust the amplitude of the flashing light.

The time during which a barcode beam is presented may be terminated upon completion of a successful scan. One illustrative procedure uses a "success tone," which is a sound generated by many types of bar code scanners to indicate a successful scan. Many types of mobile digital devices include microphones suitable for use in monitoring for success tones. In one illustrative procedure, the mobile digital device presents the barcode beam until the success tone is detected in confirmation of a successful scan, unless the presentation times out sooner. In another illustrative procedure which is shown in FIG. 11 through FIG. 13, the barcode beam is presented in individual barcode patterns referred to as symbols, which are collected into packets and sent as a set. Illustrative symbol 1100 (FIG. 11), for example, has a pattern of on and off time periods 1110, 1120, 1130, 1140, 1150, 1160 and 1170. For good coverage over both fast and slow scanners, the minimum bar width may span from about two microseconds to about forty microseconds. As shown in FIG. 12, a packet 1200 is formed by assembling multiple symbols; illustratively, symbols 1210, 1220, 1230 and 1240 are presented with suitable inter-symbol delays 1215, 1225 and 1235. As shown in FIG. 13, a set 1300 is formed by assembling multiple packets; illustratively, packets 1310, 1320, 1330 and 1340 are presented with suitable inter-packet delays 1315, 1325 and 1335. Beam presentation is terminated with success upon the detection of a success tone prior to completion of a packet, and is terminated in failure if a set completes without a success tone. The inter-symbol delay and the inter-packet delay are used to avoid false detections of success tones from other scanners in the area by closely coupling the detection window with the initiation of presentation. Either the inter-symbol delay or the inter-packet delay (or both) may be varied to in effect "sweep" across the range of possible laser scanner rates, and to avoid detection failures due to the scanner sweep rate and the presentation rate being the same but exactly out of phase.

The amplitude of the driving signal may also be adjusted to manage power while accounting for distance between the presenter and the scanner location. If the scanner is further away, the amplitude may be set to an increased power level to ensure a higher probability of a successful scan. In one illustrative procedure, the mobile digital device initially presents the barcode beam at a low amplitude while the devices monitors for the success tone that indicates a successful scan confirmation. If the success tone is not received within a prescribed time window, the barcode beam may be presented at higher amplitude.

In another enhancement, the vendor as identified specifically by name or generally by type, or the item as identified specifically by name or generally by type, or both vendor and item may be used to initially set the rate of presentation or a range of presentation rates for improving the chances for a successful barcode beam presentation. The optimal barcode presentation rate is dependent upon the nature of the scanner that is being used in the particular situation. Typically, supermarket scanners are much faster than handheld scanners to account for factors such as the high speed movements of the item being scanned, lack of precise control on the varying distance between the item and the scanner, and the variety of orientations in which the item being scanned could be presented. In contrast, handheld scanners are usually held close to the stationary item that is being scanned, unless they are being used in a factory/warehouse environment. Accordingly, the vendor or the item or both may be used to as an indication of whether to select either high speed barcode presentation or low speed barcode presentation. If a movie ticket is being presented at a theater, for example, the implementation may elect to present the barcode at slower speed more appropriate for that particular theater or for handheld scanners that are typically used in that type of theater. On the other hand, if the barcode being presented is a grocery coupon at a supermarket, then the implementation may elect to present the barcode at high speeds that are better aligned to high speed flatbed scanners found in that particular supermarket or as typically found in supermarkets generally. After having broadly identified the barcode as requiring either a fast or a slow presentation speed, the actual presentation may sweep a range of presentation speeds to account for the variety of scanners typically used. Scan rates and ranges may be maintained in a lookup table organized by vendor, item, or a combination thereof, which may be resident on the mobile digital device.

A user may be provided with an indication of when a barcode is being presented. In a mobile digital device having sound capability, a simple tone or general jingle may be played during at least part of the presentation of the barcode. Another approach is to provide the mobile digital device with a "vibration mode" such as typically found on mobile phones, and enable the vibration mode during at least part of an active barcode presentation. In a mobile digital device having a screen, a simple icon representing a barcode presentation may be displayed on all or part of the screen.

Another approach for providing the user with an indication of when a barcode is being presented is to use the light source itself. For situations in which the light source is OFF immediately prior to the presentation, the presentation of the barcode makes the light source appear to be ON which may be used as an indication that the barcode is being presented. This is because flashing the light source during the actual barcode presentation is done at such a high speed that the actual flashing of the barcode would not be perceived by a user. For situations in which the light source is ON immediately prior to the presentation, the presentation of the barcode may be done so that light source appear to flicker. Although flashing the light source during the actual barcode presentation is done at such a high speed that the actual flashing of the barcode would not be perceived by a user, a flickering appearance may be achieved by varying the power level of the light source at a rate perceivable to the user during at least part of the presentation of the barcode. Where the ambient light may be sensed by the mobile digital device, the power level may be varied between the minimum amplitude required by the ambient light conditions and maximum available to create the impression of a flickering.

Another approach for providing the user with an indication of when a barcode is being presented is to provide visual or audio content suggestive of the information being conveyed by the barcode presentation. Where the information being conveyed by the barcode presentation relates to a particular product, for example, and where the mobile digital device includes a display screen, a text description of the product or a visual still image, animation, or video that shows the product may be displayed. Where the mobile digital device has audio capability, a jingle or other sound related to the product may be played.

Although the approaches listed above for actively presenting bar code information is generally preferred for use with sequential scanners, there are instances in which statically displaying a bar code on the display of a mobile digital device may be preferred. For example, when displaying a bar code to a CCD scanner, which takes a digital image of the bar code and decodes the image using software, it may sometimes be preferred to present the bar code statically on the display of the mobile digital device. Alternatively, it may be desired to present the bar code information both statically and actively for presentation to a wider range of bar code scanners. When bar codes are statically displayed on a display, such as that of a mobile digital device, the following methods and apparatuses may be useful for improving the presentation of the bar code.

Figure 10:
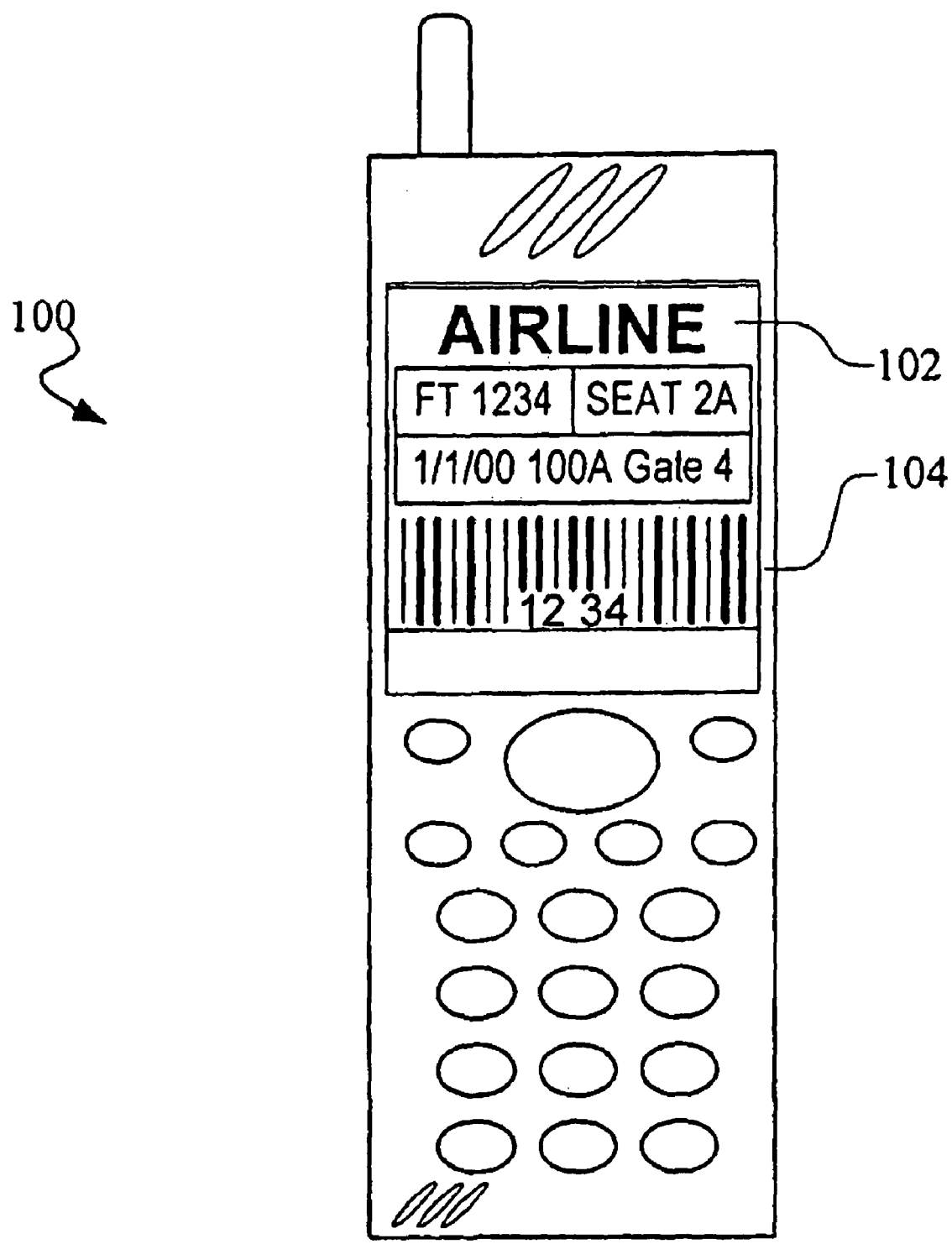
FIG. 10 is a plan view of a mobile phone in which a bar code is statically presented on a display for presentation to a bar code scanner.

FIG. 10 shows a pictorial representation of a bar code 104 statically depicted on a display 102 of a wireless phone 100. In one approach, the brightness and/or contrast of the display may be adjusted in order to increase the reliability of a scanning process. The device may, for example, automatically adjust the display to the maximum brightness and/or contrast when a bar code is displayed. In another embodiment where the device includes a color display 102, at least one element of the barcode is depicted in color. The bar code 104 may be presented in colors preferably located at opposite ends of the visual light spectrum. In this embodiment, a scanner may accept one of the colors, but more effectively reject the other color. A bar code depicted with red spaces and blue bars, for example, is more easily accepted by a scanner than a bar code depicted on a black and gray LCD display.

While the examples described above depict particular types of mobile digital devices that may benefit from the techniques described herein, many other types of mobile digital devices may benefit as well. Where a display is desire in a mobile digital device, examples of suitable display types include liquid crystal ("LCD") displays and thin film transistor ("TFT") displays. Techniques for enabling graphical images such as bar codes to be shown on these devices are well known in the art, and include, for example, bit maps, JPEG, JIF, GIF and other graphical file types; and instructions that upon execution recreate the image.

Mobile digital devices include mobile communications devices, both of the type that are well known and commercially available today, as well as a myriad of new mobile communications devices that are likely to be introduced. These devices exhibit great variety in their user input capabilities and display capabilities. Examples of mobile communications devices include personal data assistants ("PDAs") operating under such operating systems as the Palm™ operating system and the Windows™ CE operating system, a SmartPad notepad such as is available from Seiko Instruments of Torrance, Calif., and equipped with a wireless PDA device, two-way pagers, some types of consumer wireless Internet access devices ("CADs") and Internet appliances, GSM phones, WAP-enabled phones, as well as J2ME (Java 2 Micro Edition) phones available from various manufacturers such as Nokia of Helsinki, Finland, and Telefonaktiebolaget LM Ericsson of Stockholm, Sweden, personal communication system ("PCS") phones, multi-function wireless "smart" phones such as the iMODE phone available from NTT Docomo of Tokyo, Japan. Further examples of electronic devices that may be used within the scope of the present invention include a communications-enabled personal data assistant. Many different kinds of communications-enabled PDAs are available. Examples include the Palm VII connected organizer, which is available from Palm Computing, Inc. of Santa Clara, Calif.; the pdQ smartphone, which is available from QUALCOMM Incorporated of San Diego, Calif.; and a variety of PDAs suitably equipped with attached wireless modems such as, for example, the Palm III and V connected organizers with Minstrel.RTM. Wireless Palmtop Modems from Novatel Wireless Inc. of San Diego, Calif., which are distributed by Omnisky Corp. of Palo Alto, Calif. Other examples include a number of devices based on the Windows™ CE operating system such as the various devices available from, for example, Compaq Computer of Houston, Tex., Hewlett Packard of Palo Alto, Calif., Casio Corporation of Tokyo, Japan; and the Revo organizer available from Psion PLC of London, England. Another illustrative platform is the Wireless Internet Device ("WID"), a type of device that includes the functionality of a phone as well as a PDA, WAP browser, and HTML browser. An example of a WID device is the communicator platform, which is being developed by Ericsson. Another example of a suitable platform is Binary Runtime Environment for Wireless ("BREW"), which has been used in various devices such as handsets available from Samsung Electronics America Inc. of Ridgefield Park, N.J., USA, and Sharp Electronics Corporation of Mahwah, N.J., USA. Any suitable wireless technology may be used. Suitable radio frequency wireless technologies include 2G technologies such as GSM, GPRS and CDMA, 3G technologies such as W-CDMA, UMTS, HSDPA, 1xEV-DO, TD-CDMA, TD-SCDMA and PTD-S CDMA, 4G technologies such as UMTS Revision 8, UMB, iBurst, HIPERMAN, WiMAX, and WiBro. Other suitable wireless technologies include Wi-Fi and Bluetooth. Suitable light-based technologies include infrared. Examples of user input capabilities offered by these devices include keypad, keyboard, stylus, ink, handwriting recognition, voice recognition, and so forth.

Mobile digital devices also include mobile entertainment devices, including types of mobile entertainment devices that are well known and commercially available today, as well as a myriad of new types of mobile entertainment devices that are likely to be introduced. These devices exhibit great variety in their user input capabilities and display capabilities, and may also benefit from the techniques described herein whether or not they are provided with wireless communications capability. Examples of mobile entertainment devices that have no or inadequate wireless communications capability include some personal digital assistants; some gaming devices; and many audio and video players (including the popular iPod® mobile digital devices available from Apple Computer Corporation of Cupertino, Calif., USA, and the Zen MicroPhoto MP3 player available from Creative Labs Inc. of Milpitas, Calif., USA). Even without adequate wireless communications capability, many of these mobile entertainment devices have the ability to synchronize with or accept entertainment content from computers, and this capability may be used to furnish information to the mobile entertainment device that may later be communicated in bar code form from the mobile entertainment device to a bar code scanner. In the context of music, picture and video downloads, for example, devices such as the iPod device and the Zen Vision M device may receive a coupon for device accessories or other goods and services during the entertainment content download process, and that coupon may be presented while the user later shops at a store by using the techniques described herein. Other mobile digital devices have numerous data transfer options, including wireless communications capabilities. The Playstation® Portable ("PSP") device available from Sony Computer Entertainment America Inc. of Foster City, Calif., USA, for example, has built-in Wi-Fi, an infrared port, a USB 2.0 port, a Memory Stick Duo™ slot, and a UMD drive, any one of which may be used to transfer a coupon along with entertainment content such as games, movies, videos, photos, and music for later use in accordance with the techniques described herein.

Figure 14:
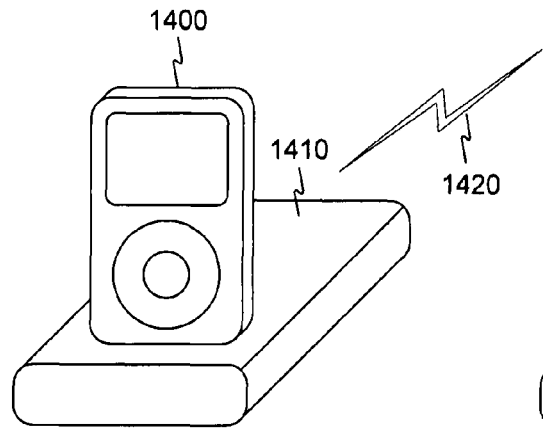
FIG. 14 is a perspective diagram of an iPod device mounted in a wireless dock.
Figure 15:
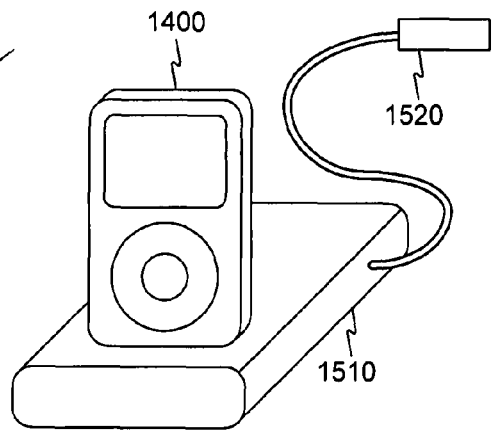
FIG. 15 is a perspective diagram of an iPod device mounted in a wired dock.
Figure 16:
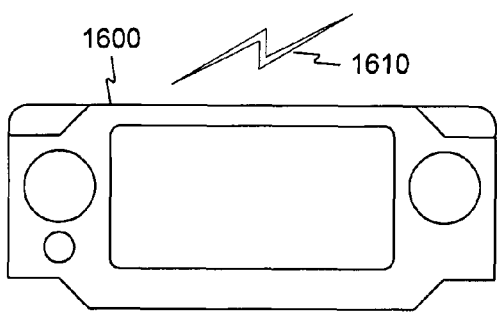
FIG. 16 is a plan diagram of a PSP device communicating with Wi-Fi.
Figure 17:
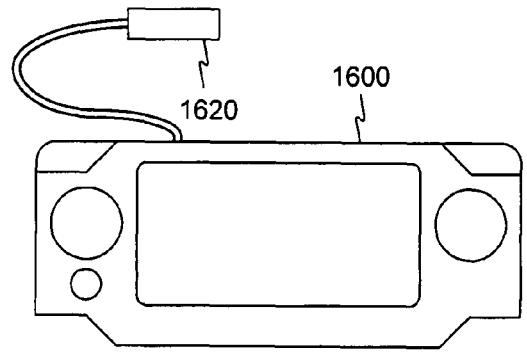
FIG. 17 is a plan diagram of a PSP device communicating over a cable.
Figure 18:
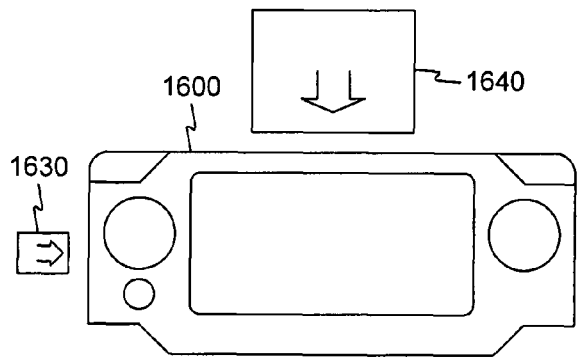
FIG. 18 is a plan diagram of a PSP device receiving a disc and flash memory.
Figure 19:
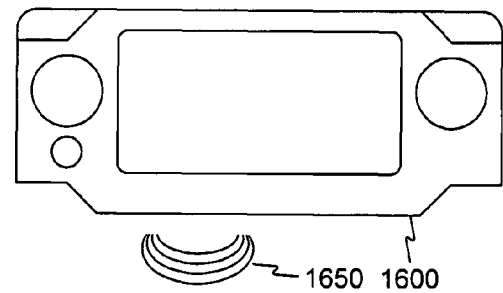
FIG. 19 is a plan diagram of a PSP device communicating with infrared.

Various techniques for delivering entertainment content that in accordance with the techniques described herein may contain transmission information are shown in FIG. 14 through FIG. 19. FIG. 14 shows an iPod device 1400 inserted into a dock 1410, which is in communication over Wi-Fi (1420) with a local network for access to a computer or entertainment system. FIG. 15 shows the iPod device 1400 inserted into a dock 1510 which is in communication over a cable or cables 1520 with a computer or entertainment system. FIG. 16 shows a PSP device 1600 which is in communication over Wi-Fi (1610) with a local network for access to a computer or home audio system. FIG. 17 shows the PSP device 1600 which is in communication over a cable or cables 1620 with a computer or entertainment system. FIG. 18 shows the PSP device 1600 receiving removable media, specifically a UMD disc 1640 and a Memory Stick Duo 1630. FIG. 19 shows a PSP device 1600 which is in infrared communication (1650) with a computer. These techniques are illustrative, and many other techniques may be used as well. Transmission information may be provided with the entertainment content in a myriad of different ways, either as separate data preceding or following the entertainment content, or integrated with the entertainment content in a manner depending on the type of entertainment content. Various digital data integration techniques that are well known in the art are suitable for integrating transmission digital information with entertainment content.

Convergence is creating mobile digital devices that integrate sophisticated mobile communications device capabilities with mobile entertainment device capabilities. A recent convergence product is the iPhone™ mobile digital device available from Apple Inc. of Cupertino, Calif., USA. Earlier convergence products include music phones, communications-enabled PDA's, and smartphones, which incorporate music players and in some cases video players. The techniques described herein are beneficial for such convergence products.

The capacity of a mobile digital device to detect when a transfer of information to a bar code scanner is complete may also be used to further facility the transfer of information and support other functionality. When a scanner completes a scan, it typically emits a success tone, typically a beep. The success tone may be detected by the mobile digital device through the use of a microphone. Many types of mobile digital devices include built-in microphones, and microphones and if necessary LEDs may be cheaply and easily added to types of mobile digital devices such as USB Flash memory devices, which may or may not normally have such components built in. The additional supported functional depends on the nature of the transaction. Where a coupon is being redeemed, for example, the mobile digital device may register that the coupon has been used, which corresponds to the store taking the coupon in a paper coupon situation. Where a ticket or season pass is presented for entry into an event such as a theatrical event or a sports event, the mobile digital device may register that the ticket or season pass has been used for that event. Where the mobile digital device is a PDA and one wishes to keep a diary of events, each confirmation may be automatically entered into a calendar function of the PDA along with, for example, representative information to identify the type of information transferred.

Confirmation of completion of a scan may be used in many other ways, including, for example, in accordance with the techniques described in U.S. Pat. No. 6,736,322, issued May 18, 2004 to Gobburu et al. and entitled "Method and apparatus for acquiring, maintaining, and using information to be communicated in bar code form with a mobile communications device," which hereby is incorporated herein in its entirety by reference thereto. These techniques involve providing a user with a secure database containing information in diverse categories that relates to the user and that may be represented at least in part in bar code form and communicated with light from a mobile digital device. The diverse information is obtained from any combination of a variety of vendor and governmental computer systems, internet service providers, and communications devices. The user has access to the database using a mobile digital device for displaying, managing, and entering information, and for communicating information in bar code form with light. The user first selects the category that contains the specific item of information, and then selects the specific item of information. The specific item of information then is communicated in bar code form with light from the mobile digital device for scanning by a bar code scanner to obtain the desired good or service.

Different types of scanners emit different sounds, and the frequency and/or tone or other characteristic of the sound may be used to support additional functionality. An example of such additional functionality is security. Scanners of the type typically used at grocery stores may emit a different frequency and/or tone than the type of scanners used at movie theaters and sporting events, so that a particular frequency and/or tone can be expected based on the type of ticket or coupon or other information being communicated, and confirmation may be requested or the transaction declined if the frequency and/or tone received does not match the anticipated frequency and/or tone. If desired, particular models of scanners may be provided with unique sounds using frequency, tone, cadence, melody, or indeed any other sound characteristics, and the ticket, coupon or other bar code information may require that this particular unique sound be detected by the in order for the transaction to complete.

Implementation of the techniques described herein may be facilitated by the use of standards wherever possible. Advantageously, Bluetooth for wireless communication and JAVA for programming are in widespread use and are suitable for implementing the techniques described herein. SMS is also in widespread use, and is suitable as a barcode distribution format. A single SMS message may include a barcode tag, a barcode control tag, a barcode payload, a checksum, and a barcode end. The barcode payload may include the product distributor's name, the product name, the product code, a product promotional banner, the product value, a promotion expiry date, and a promotion extended field. While the entire capacity of an SMS message may be used, roughly fifty characters is sufficient for many distributions, with distributions generally falling in the range of 12 characters to 100 characters.

The description of the invention including its applications and advantages as set forth herein is illustrative and is not intended to limit the scope of the invention, which is set forth in the claims which follow. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A method of communicating transmission information from a mobile digital device to a bar code scanner, comprising:
   maintaining the transmission information on the mobile digital device;
   generating, in the mobile digital device, a signal to simulate a reflection of a bar code scanner scanning beam being moved across a static visual image of the transmission information in a bar code format; and
   transmitting light pulses from the mobile digital device in accordance with the signal.

2. The method of claim 1, further comprising:
   receiving the transmission information in the bar code format on the mobile digital device;
   wherein the maintaining step comprises maintaining the transmission information on the mobile digital device in the bar code format.

3. The method of claim 1, further comprising:
   receiving the transmission information on the mobile digital device in a first format that is not the bar code format; and
   encoding the transmission information from the first format into a second format in the mobile digital device, the second format being the bar code format;
   wherein the maintaining step comprises maintaining the transmission information on the mobile digital device in the first format.

4. The method of claim 3 further comprising identifying a bar code type, wherein the bar code format corresponds to the bar code type.

5. The method of claim 1, further comprising receiving the transmission information on the mobile digital device from a removable storage device inserted in the mobile digital device.

6. The method of claim 1, further comprising receiving the transmission information on the mobile digital device from a personal computer over a wired connection.

7. The method of claim 1, further comprising receiving the transmission information on the mobile digital device from a personal computer over a wireless connection.

8. The method of claim 1, further comprising receiving the transmission information on the mobile digital device over a wireless connection.

9. The method of claim 8, wherein the wireless connection is a radio frequency connection.

10. The method of claim 8, wherein the wireless connection is an infrared connection.

11. The method of claim 1 wherein the mobile digital device comprises a mobile entertainment device, further comprising:
    receiving entertainment content on the mobile digital device; and
    receiving the transmission information on the mobile digital device in conjunction with the entertainment content receiving step.

12. The method of claim 11 wherein the entertainment content comprises digital audio, digital video, still pictures, animation, gaming-related information, or any combination of the foregoing.

13. The method of claim 1 wherein:
the mobile digital device comprises a display screen having at least one controllable light-related property, the controllable light-related property being a brightness property, a contrast property, or a color property; and
the light pulses transmitting step comprises altering the light-related property.

14. The method of claim 1 wherein:
the mobile digital device comprises a display screen having a first controllable light-related property, the first controllable light-related property being a brightness property, a contrast property, or a color property, and further having a second controllable light-related property, the second controllable light-related property being a brightness property, a contrast property, or a color property, wherein the first controllable light-related property and the second controllable light-related property are different; and
the light pulses transmitting step comprises simultaneously altering the first controllable light-related property and the second controllable light-related property.

15. The method of claim 1 wherein:
the mobile digital device comprises a plurality of light emitting elements; and
the light pulses transmitting step comprises simultaneously driving the light emitting elements in accordance with the signal.

16. The method of claim 15, wherein the plurality of light emitting elements is an array of light emitting diodes.

17. The method of claim 1 wherein the mobile digital device comprises a display screen, further comprising presenting the static visual image of the transmission information in the bar code format on the display screen.

18. The method of claim 1, further comprising presenting information representative of the transmission information with the mobile digital device.

19. The method of claim 18 wherein the mobile digital device comprises a display screen, the information representative of the transmission information being presented on the display screen.

20. The method of claim 19 wherein:
the transmission information pertains to a product; and
the information representative of the transmission information comprises an image of the product.

21. The method of claim 18 wherein the mobile digital device comprises an audio output, the information representative of the transmission information being presented via the audio output.

22. The method of claim 21 wherein:
the transmission information pertains to a product; and
the information representative of the transmission information comprises a sound indicative of the product.

23. The method of claim 1 wherein the mobile digital device comprises a display screen having at least one controllable light-related property, further comprising:
presenting information representative of the transmission information from the display screen;
wherein the light pulses transmitting step comprises altering the light-related property during the representative information presentation step.

24. The method of claim 23 further comprising establishing a brightness property of the display screen during the information presenting step and the light pulses transmitting step as a function of ambient light.

25. The method of claim 23 further comprising establishing a brightness property of the display screen during the information presenting step and the light pulses transmitting step as a function of distance to the bar code scanner.

26. The method of claim 1 wherein:
the transmission information comprises an indication of item; and
the generating step comprises generating the signal to simulate a reflection of the scanning beam being moved across the static visual image of the transmission information in the bar code format at a rate applicable to bar code scanners generally used for the item.

27. The method of claim 1 wherein:
the transmission information comprises an indication of vendor; and
the generating step comprises generating the signal to simulate a reflection of the scanning beam being moved across the static visual image of the transmission information in the bar code format at a rate applicable to bar code scanners generally used by the vendor.

28. The method of claim 1 further comprising providing from the mobile digital device an indication perceivable to a user of the mobile digital device of communication of transmission information from the mobile digital device.

29. The method of claim 28 wherein the user indication providing step comprises providing the indication in an audible form during at least part of the light pulses transmitting step.

30. The method of claim 28 wherein the user indication providing step comprises providing the indication in a viewable form during at least part of the light pulses transmitting step.

31. The method of claim 28 wherein:
the mobile digital device comprises a vibrator; and
the user indication providing step comprises activating the vibrator during at least part of the light pulses transmitting step.

32. The method of claim 28 wherein the user indication providing step comprises varying amplitude of the light pulses during at least part of the light pulses transmitting step to create a humanly-perceivable impression of flickering.

33. The method of claim 1 further comprising:
monitoring for a bar code scanner success tone during the light pulses transmitting step; and
terminating the light pulses transmitting step upon detection of the bar code scanner success tone during the success tone monitoring step.

34. The method of claim 1 further comprising:
monitoring for a bar code scanner success tone during the light pulses transmitting step; and
wherein the light pulses transmitting step is repetitively performed at increasing power levels until a success tone is detected in the success tone monitoring step.

35. The method of claim 1, further comprising:
receiving a scanning beam emitted by a bar code scanner; and
determining a scan rate of the scanning beam;
wherein the generating step comprises generating the signal to simulate a reflection of a scanning beam being moved at the scan rate across the static visual image of the transmission information in the bar code format.

36. A mobile digital device comprising:
a light source;
a stored program component for maintaining the transmission information on the mobile digital device;

a stored program component for generating a signal to simulate a reflection of a scanning beam of a bar code scanner being moved across a static visual image of the transmission information in a bar code format; and a stored program component for transmitting light pulses from the light source in accordance with the signal.

37. The mobile digital device of claim 36, further comprising:

a stored program component for receiving the transmission information in the bar code format on the mobile digital device;

wherein the maintaining stored program component comprises a stored program component for maintaining the transmission information on the mobile digital device in the bar code format.

38. The mobile digital device of claim 36, further comprising:

a stored program component for receiving the transmission information on the mobile digital device in a first format that is not the bar code format; and a stored program component for encoding the transmission information from the first format into a second format in the mobile digital device, the second format being the bar code format;

wherein the maintaining stored program component comprises a stored program component for maintaining the transmission information on the mobile digital device in the first format.

39. The mobile digital device of claim 36, further comprising:

a removable storage device; and a stored program component for receiving the transmission information from the removable storage device.

40. The mobile digital device of claim 36, further comprising:

a port for wired communications; and a stored program component for receiving the transmission information via the port.

41. The mobile digital device of claim 36, further comprising:

a port for wireless communications; and a stored program component for receiving the transmission information via the port.

42. The mobile digital device of claim 36 wherein the mobile digital device comprises a mobile entertainment device, further comprising a program component for receiving entertainment content containing the transmission information.

43. The mobile digital device of claim 42 wherein the entertainment content comprises digital audio, digital video, still pictures, animation, gaming-related information, or any combination of the foregoing.

44. The mobile digital device of claim 36 further comprising:

a display screen having at least one controllable light-related property;

wherein the transmitting stored program component comprises a stored program component for altering the light-related property.

45. The mobile digital device of claim 44 wherein the controllable light-related property is a brightness property, a contrast property, or a color property.

46. The mobile digital device of claim 44 further comprising a stored program component for presenting information representative of the transmission information from the display screen in synchrony with alteration of the light-related property by the transmitting stored program component.

47. The mobile digital device of claim 46 further comprising:

an ambient light sensor; and a program component responsive to the ambient light sensor for establishing a brightness property of the display screen while information representative of the transmission information from the display screen is presented and the light-related property of the display screen is altered.

48. The mobile digital device of claim 36 further comprising:

a display screen having a first controllable light-related property and a second controllable light-related property;

wherein the first controllable light-related property and the second controllable light-related property are different; and wherein the transmitting stored program component comprises a stored program component for simultaneously altering the first controllable light-related property and the second controllable light-related property.

49. The mobile digital device of claim 48 wherein:

the first controllable light-related property is a brightness property, a contrast property, or a color property; and the second controllable light-related property is a brightness property, a contrast property, or a color property.

50. The mobile digital device of claim 48 further comprising a stored program component for presenting information representative of the transmission information from the display screen in synchrony with alteration of the first and second light-related properties by the transmitting stored program component.

51. The mobile digital device of claim 36 further comprising:

a plurality of light emitting elements;

wherein the transmitting stored program component comprises a stored program component for simultaneously driving the light emitting elements in accordance with the signal.

52. The mobile digital device of claim 51 wherein the plurality of light emitting elements is an array of light emitting diodes.

53. The mobile digital device of claim 36 further comprising:

a display screen; and a stored program component for presenting the static visual image of the transmission information in the bar code format on the display screen.

54. The mobile digital device of claim 36 further comprising:

a display screen; and a stored program component for presenting information representative of the transmission information on the display screen.

55. The mobile digital device of claim 36 further comprising:

an audio output; and a stored program component for presenting information representative of the transmission information via the audio output.

56. The mobile digital device of claim 36 wherein:

the transmission information comprises an indication of item; and the generating stored program component comprises a stored program component for generating the signal to simulate a reflection of the scanning beam being moved across the static visual image of the transmission information in the bar code format at a rate applicable to bar code scanners generally used for the item.

57. The mobile digital device of claim 36 wherein:

the transmission information comprises an indication of vendor; and the generating stored program component comprises a stored program component for generating the signal to simulate a reflection of the scanning beam being moved across the static visual image of the transmission information in the bar code format at a rate applicable to bar code scanners generally used for the vendor.

58. The mobile digital device of claim 36 further comprising a stored program component for providing an indication perceivable to a user of communication of transmission information.

59. The mobile digital device of claim 36 further comprising:

an audio sensor; and a stored program component responsive to the audio sensor for terminating transmission of light pulses upon detection of the bar code scanner success tone during a window generally coinciding with the transmission of the light pulses.

60. The mobile digital device of claim 36 further comprising:

a scanning beam detector; and a stored program component responsive to the scanning beam detector for determining a scan rate;

wherein the generating stored program component comprises a stored program component for generating the signal to simulate a reflection of a scanning beam being moved at the scan rate across the static visual image of the transmission information in the bar code format.

* * * * *